United States Patent
Pan

(10) Patent No.: US 11,647,294 B2
(45) Date of Patent: May 9, 2023

(54) PANORAMIC VIDEO DATA PROCESS

(71) Applicant: Shanghai Bilibili Technology Co., Ltd., Shanghai (CN)

(72) Inventor: Yihan Pan, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/730,950

(22) Filed: Apr. 27, 2022

(65) Prior Publication Data
US 2022/0385810 A1 Dec. 1, 2022

(30) Foreign Application Priority Data

| May 25, 2021 | (CN) | 202110571013.4 |
| May 25, 2021 | (CN) | 202110571830.X |
| May 25, 2021 | (CN) | 202110573171.3 |

(51) Int. Cl.
*H04N 23/698* (2023.01)
*G06V 20/40* (2022.01)
*G06T 7/73* (2017.01)

(52) U.S. Cl.
CPC ............ *H04N 23/698* (2023.01); *G06T 7/74* (2017.01); *G06V 20/46* (2022.01); *G06T 2207/10016* (2013.01)

(58) Field of Classification Search
CPC ............ H04N 23/698; G06T 7/74; G06T 2207/10016; G06V 20/46
See application file for complete search history.

(56) References Cited

U.S. PATENT DOCUMENTS

| 10,217,488 B1 * | 2/2019 | Huang | G06T 7/292 |
| 2014/0049600 A1 * | 2/2014 | Goldner | G08B 29/185 |
| | | | 348/36 |
| 2018/0367777 A1 * | 12/2018 | Li | H04N 23/698 |

FOREIGN PATENT DOCUMENTS

| CN | 103345630 A | 10/2013 |
| CN | 107025659 A | 8/2017 |
| CN | 108650500 A | 10/2018 |
| CN | 111596297 A | 8/2020 |
| CN | 112019768 A | 12/2020 |
| CN | 112073748 A | 12/2020 |
| CN | 112785628 A | 5/2021 |
| WO | 2020/248900 A1 | 12/2020 |

* cited by examiner

*Primary Examiner* — Thai Q Tran
*Assistant Examiner* — Jose M Mesa
(74) *Attorney, Agent, or Firm* — McAndrews, Held & Malloy, Ltd.

(57) ABSTRACT

A method is provided. The method includes: generating a tracking plane image of a next video frame by using reference polar coordinates of a central position of a play plane image of a current video frame as a center based on a panoramic image of the next video frame in a spherical polar coordinate system; determining updated polar coordinates of a central position of a target object in the tracking plane image of the next video frame in the spherical polar coordinate system based on an object feature of the target object; and using the updated polar coordinates as the reference polar coordinates to re-perform the generating a tracking plane image of a next video frame by using reference polar coordinates as a center based on a panoramic image of the next video frame in a spherical polar coordinate system.

20 Claims, 12 Drawing Sheets

PANORAMIC VIDEO DATA PROCESS

CROSS-REFERENCE TO RELATED APPLICATIONS

This application claims priority to Chinese Patent Application No. 202110571830.X, filed on May 25, 2021, entitled "Method and apparatus of processing panoramic video data", Chinese Patent Application No. 202110573171.3, filed on May 25, 2021, entitled "Method and apparatus of processing panoramic video data", and Chinese Patent Application No. 202110571013.4, filed on May 25, 2021, entitled "Method and apparatus of processing panoramic video data", the entire content of which are hereby incorporated by reference in their entirety for all purposes.

TECHNICAL FIELD

This application relates to the field of image processing technologies, and in particular, to a panoramic video data processing method, a computing device, and a computer-readable storage medium.

BACKGROUND

With the rapid development of computer technologies and image processing technologies, panoramic videos emerge, shooting and production of panoramic videos become more popular, and many video websites also take panoramic videos as a specialized category for users to select and watch. A panoramic video is a dynamic video shot using a panoramic camera and including 360-degree omnidirectional image content. In the panoramic video, a still panoramic image is converted into a dynamic video image, and users can randomly watch dynamic videos within a range of a shooting angle of the panoramic camera.

SUMMARY

In view of this, embodiments of this application provide a panoramic video data processing method. This application also relates to a panoramic video data processing apparatus, a computing device, and a computer-readable storage medium, to resolve a problem that viewing experience of a panoramic video is relatively poor in the conventional technology.

According to a first aspect of the embodiments of this application, a panoramic video data processing method is provided and includes:

in response to receiving a box-selection operation for a target object in a current video frame, determining reference polar coordinates of a central position of a play plane image of the current video frame in a spherical polar coordinate system;

determining an object feature corresponding to the target object;

generating a tracking plane image of a next video frame by using the reference polar coordinates as a center based on a panoramic image of the next video frame in the spherical polar coordinate system;

determining updated polar coordinates of the central position of the target object in the tracking plane image of the next video frame in the spherical polar coordinate system based on the object feature of the target object; and using the updated polar coordinates as the reference polar coordinates to re-perform the generating a tracking plane image of a next video frame by using the reference polar coordinates as a center based on a panoramic image of the next video frame in the spherical polar coordinate system, until determining a tracking stop condition is reached and a reference polar coordinate sequence corresponding to the current video frame to a target video frame is obtained, wherein the target video frame is a corresponding video frame in response to determining the tracking stop condition is reached.

According to a second aspect of the embodiments of this application, a computing device is provided and includes:

one or more processors;

a memory storing one or more programs configured to be executed by the one or more processors, the one or more programs including instructions for:

in response to receiving a box-selection operation for a target object in a current video frame, determining reference polar coordinates of a central position of a play plane image of the current video frame in a spherical polar coordinate system;

determining an object feature corresponding to the target object;

generating a tracking plane image of a next video frame by using the reference polar coordinates as a center based on a panoramic image of the next video frame in the spherical polar coordinate system;

determining updated polar coordinates of the central position of the target object in the tracking plane image of the next video frame in the spherical polar coordinate system based on the object feature of the target object; and using the updated polar coordinates as the reference polar coordinates to re-perform the generating a tracking plane image of a next video frame by using the reference polar coordinates as a center based on a panoramic image of the next video frame in the spherical polar coordinate system, until determining a tracking stop condition is reached and a reference polar coordinate sequence corresponding to the current video frame to a target video frame is obtained, wherein the target video frame is a corresponding video frame in response to determining the tracking stop condition is reached.

According to a third aspect of the embodiments of this application, a non-transient computer-readable storage medium is provided. The computer-readable storage medium stores one or more programs, the one or more programs comprising instructions, wherein the instructions, upon the execution by one or more processors of an electronic device, cause the electronic device to perform:

in response to receiving a box-selection operation for a target object in a current video frame, determining reference polar coordinates of a central position of a play plane image of the current video frame in a spherical polar coordinate system;

determining an object feature corresponding to the target object;

generating a tracking plane image of a next video frame by using the reference polar coordinates as a center based on a panoramic image of the next video frame in the spherical polar coordinate system;

determining updated polar coordinates of the central position of the target object in the tracking plane image of the next video frame in the spherical polar coordinate system based on the object feature of the target object; and using the updated polar coordinates as the reference polar coordinates to re-perform the generating a tracking plane image of a next video frame by using the reference polar coordinates as a center based on a panoramic image of the next video frame in the spherical polar coordinate system, until determining a tracking stop condition is reached and a reference polar coordinate sequence corresponding to the current video frame to a target video frame is obtained, wherein the target video frame is a corresponding video frame in response to determining the tracking stop condition is reached.

BRIEF DESCRIPTIONS OF DRAWINGS

DETAILED DESCRIPTION OF EMBODIMENTS

Figure 1:
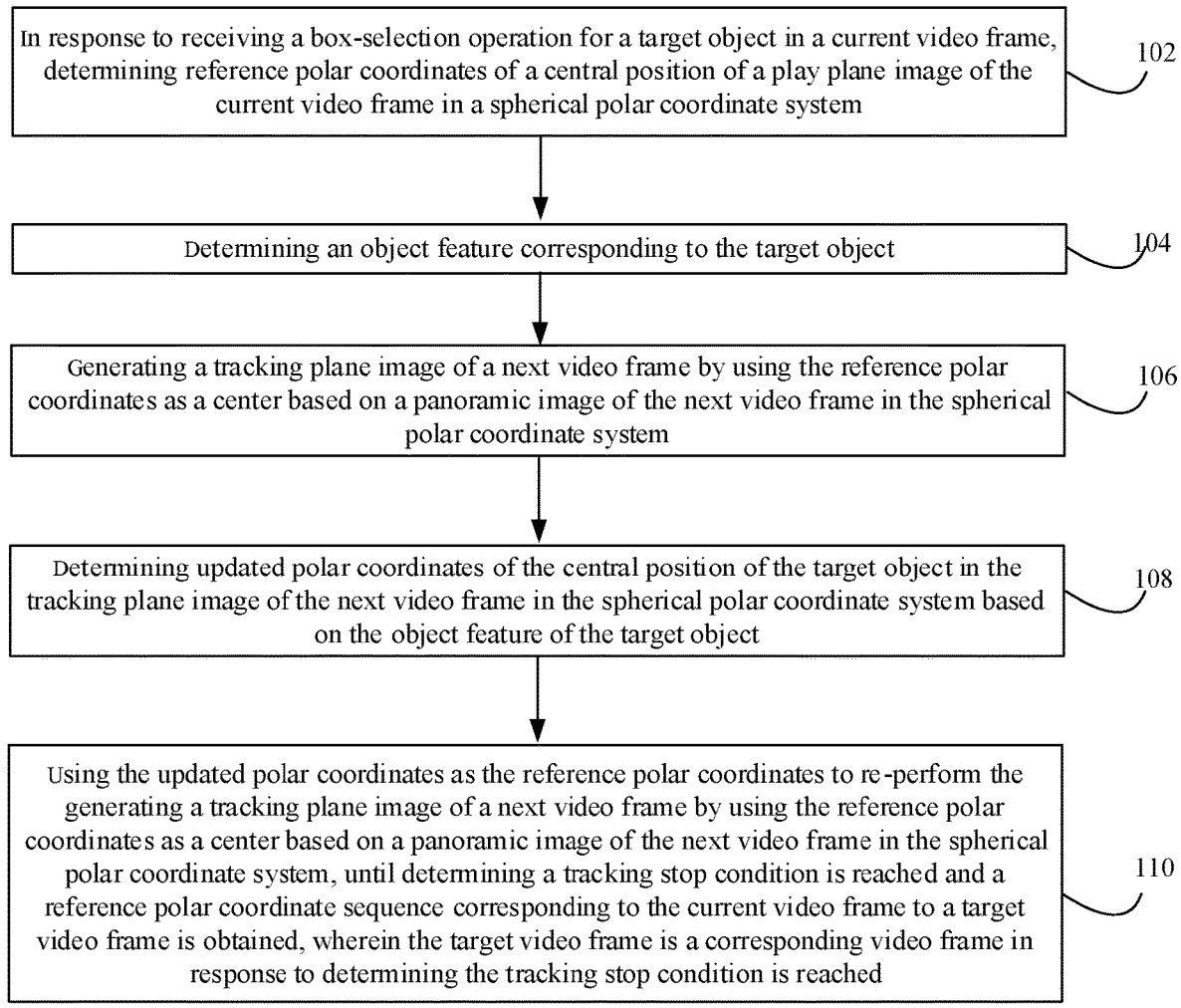
FIG. 1 is a flowchart illustrating a panoramic video data processing method according to some embodiments of this application.

Many details are described in the following descriptions to facilitate full understanding of this application. However, this application can be implemented in many different manners from those described herein. A person skilled in the art may make similar promotion without departing from the connotation of this application. Therefore, this application is not limited to the some implementations disclosed below.

Terms used in one or more embodiments of this application are merely used to describe some embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of the same type. For example, without departing from the scope of one or more embodiments of this application, "first" may also be referred to as "second", and similarly, "second" may also be referred to as "first". Depending on the context, for example, the word "if" used herein can be explained as "while", "when", or "in response to determining".

Nouns related to one or more embodiments of this application are first explained.

In related art, the panoramic video shot needs to be processed frame by frame by a panoramic video creator to generate a plane image provided to a user for viewing a panoramic video, which decreases efficiency of processing the panoramic video, and consumes much more energy.

In related art, when the panoramic video is shot, an object or a target that needs to be focused is not fixed at a certain angle of view because the panoramic video can cover a 360-degree angle of view. In addition, when the panoramic video is played, image content of the 360-degree angle of view cannot be completely displayed on a play apparatus at a time, and a user needs to constantly select an appropriate viewing angle. The viewing angle is an image play angle of the current video. In other words, when the user watches the panoramic video, the user needs to constantly drag the viewing angle to view desired content, which is relatively troublesome and leads to poor viewing experience of the panoramic video.

In related art, when tracking a target object in a panoramic video, the panoramic video is often directly decoded into a frame sequence image, and then the target object is directly recognized and tracked frame by frame on the decoded original panoramic image. However, when the target object passes through the spherical polar coordinate system or passes directly below or above the spherical polar coordinate system at a large angle, that is, when the target object moves at a large angle, the currently playing picture will instantaneously have the effect of nearly vertical turnover or large angle deflection, which may lead to the inability to track the target object, thus the tracking effect is poor.

A method of processing panoramic video data, and an apparatus of processing panoramic video data, a computing device, and a computer-readable storage medium are provided in present application, and are described in detail one by one in the following embodiments.

FIG. 1 is a flowchart of a panoramic video data processing method according to some embodiments of the present application, which specifically includes the steps as follows.

Step 102: in response to receiving a box-selection operation for a target object in a current video frame, determining reference polar coordinates of a central position of a play plane image of the current video frame in a spherical polar coordinate system;

Step 104: determining an object feature corresponding to the target object; Step 106: generating a tracking plane image of a next video frame by using the reference polar coordinates as a center based on a panoramic image of the next video frame in the spherical polar coordinate system;

Step 108: determining updated polar coordinates of the central position of the target object in the tracking plane image of the next video frame in the spherical polar coordinate system based on the object feature of the target object; and Step 110: using the updated polar coordinates as the reference polar coordinates to re-perform the generating a tracking plane image of a next video frame by using the reference polar coordinates as a center based on a panoramic image of the next video frame in the spherical polar coordinate system, until determining a tracking stop condition is reached and a reference polar coordinate sequence corresponding to the current video frame to a target video frame is obtained, wherein the target video frame is a corresponding video frame in response to determining the tracking stop condition is reached.

According to some embodiments, after box-selection operation for the target object is performed by the creator, the reference polar coordinates of a central position of a play plane image of the current video frame in a spherical polar coordinate system may be determined, an object feature corresponding to the target object is determined, a tracking plane image of a next video frame is generated by using the reference polar coordinates as a center, the updated polar coordinates of the central position of the target object in the tracking plane image of the next video frame is determined based on the object feature of the target object and may be determined as the reference polar coordinates used to generate a tracking plane image of a next video frame, so that the corresponding panoramic video may be played always. In other words, once the creator box-selects the target object, the tracking plane image with the reference polar coordinates as a center can be automatically generated for target tracking without need of processing the panoramic video frame by frame by the creator, which greatly improves efficiency of processing the panoramic video.

According to some embodiments, the determining reference polar coordinates of a central position of a play plane image of the current video frame in a spherical polar coordinate system includes:

determining, upon receiving a box-selection operation for a target object at a center of a playback plane image for a current video frame, reference polar coordinates of a central position of the target object in a spherical coordinate system; and determining the reference polar coordinates of a central position of the target object as the reference polar coordinates of a central position of a play plane image of the current video frame.

According to some embodiments, the target object is at a center of a playback plane image for a current video frame. When the target object that is at the center of the playback plane image of the current video is box-selected by the creator, the reference polar coordinates of the central position of the target object in the spherical coordinate system may be determined as a center of generating the tracking plane image for the next video frame to be generated, so that the corresponding panoramic video is played always with the target object located at the center of the corresponding panoramic video. In other words, once the creator box-selects the target object, the tracking plane image with the target object located at the center can be automatically generated for target tracking. For the target object, centers of viewing angle for consecutive tracking plane images can be automatically generated without need of processing the panoramic video frame by frame by the creator, which greatly improves efficiency of processing the panoramic video. Thus, a specific default center of viewing angle for a plane image may be provided to a user for viewing the panoramic video and the specific default center is center on the target object box-selected. In addition, as for the target object that is box-selected, the target object in the panoramic video is tracked based on the spherical coordinate system, a tracking failure that is caused by a picture distortion induced by different positions of the target object in the panoramic video, thereby the accuracy and success rate of target tracking may be improved, and panoramic video processing and playback effects may be improved.

Figure 2:
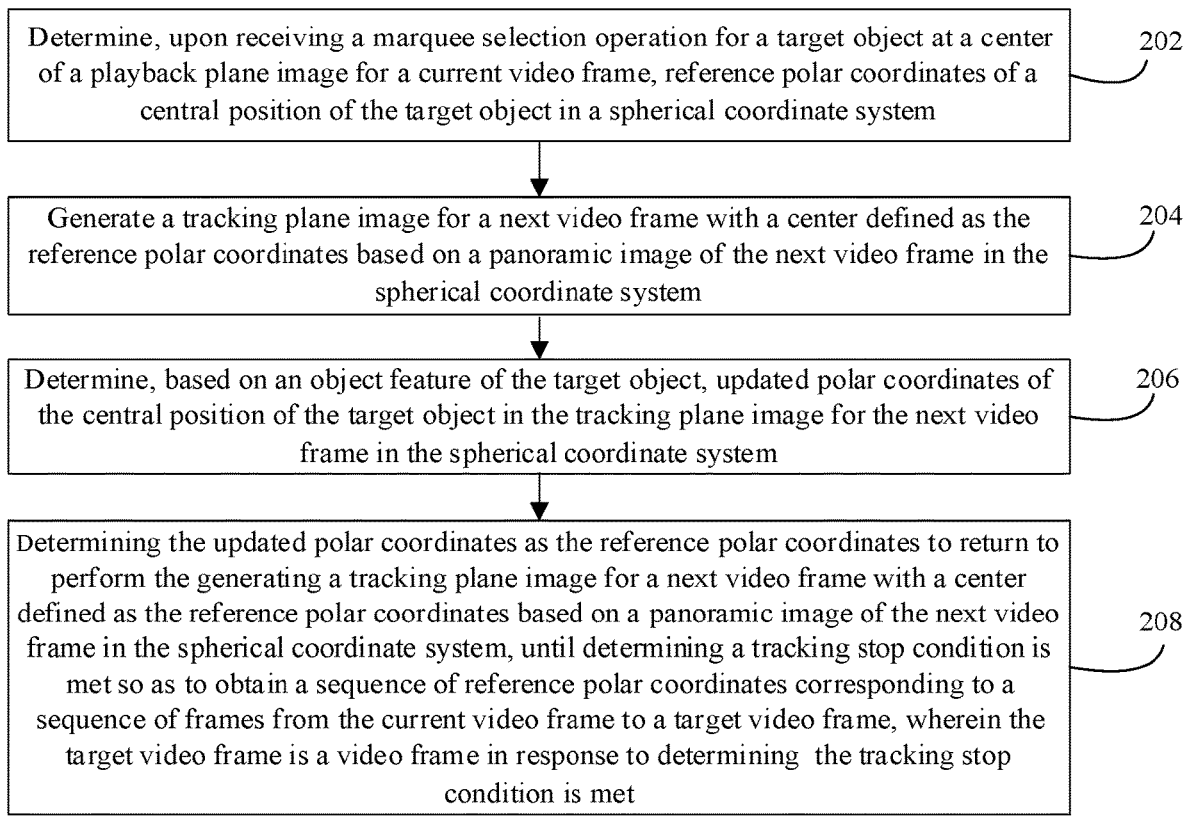
FIG. 2 is a flowchart illustrating a panoramic video data processing method according to some embodiments of this application.

FIG. 2 is a flowchart of a panoramic video data processing method according to some embodiments of the present application, which specifically includes the steps as follows.

Step 202: Determine, upon receiving a box-selection operation for a target object at a center of a playback plane image for a current video frame, reference polar coordinates of a central position of the target object in a spherical coordinate system.

In practical applications, since a panoramic video itself can cover a 360-degree viewing angle, during the shooting of the panoramic video, a main object or target to be shot is not necessarily fixed within a certain viewing angle range. Moreover, during playback of the panoramic video, it is impossible that all images within the 360-degree viewing angle are displayed on a playback apparatus at a time, and a user needs to select a suitable viewing angle which is a viewing angle for playing a current image of the video. In other words, when viewing a panoramic video, a user needs to constantly drag a viewing angle so as to view desirable content, which is troublesome and brings a poor experience of viewing a panoramic video.

Moreover, if a video creator wants a user to have a specific center of viewing angle for a playback image while viewing a panoramic video, the panoramic video shot needs to be processed frame by frame, which lowers efficiency of processing panoramic video, and consumes much more energy. In addition, at present, during the processing of a panoramic video frame-by-frame, the panoramic video is often directly decoded into a frame sequence image, and then target tracking is directly performed on original panoramic images frame by frame. A picture distortion may be induced by different positions of the target in the original panoramic image, which may cause a failure of target tracking.

Therefore, to improve efficiency of processing panoramic video and a tracking success rate of a target object, a method of processing panoramic video data is provided in the present application, in which, upon receiving a box-selection operation for a target object that is at the center of a playback plane image for a current video frame, reference polar coordinates of a central position of the target object in a spherical coordinate system is determined; a tracking plane image for a next video frame with a center defined as the reference polar coordinates is generated based on a panoramic image of the next video frame in the spherical coordinate system; updated polar coordinates of the central position of the target object in the tracking plane image for the next video frame in the spherical coordinate system is determined based on an object feature of the target object; and the updated polar coordinates is determined as the reference polar coordinates to return to perform the generating a tracking plane image for a next video frame with a center defined as the reference polar coordinates based on a panoramic image of the next video frame in the spherical coordinate system, until determining a tracking stop condition is met, so as to obtain a sequence of reference polar coordinates corresponding to a sequence of frames from the current video frame to a target video frame, where the target video frame is a video frame in response to determining the tracking stop condition is met. In this way, for the target object, centers of viewing angle for consecutive tracking plane images can be automatically generated without need of processing the panoramic video frame by frame by the creator, which greatly improves the panoramic video processing efficiency. In addition, as, for the target object that is box-selected, the target object in the panoramic video is tracked based on the spherical coordinate system, a tracking failure which is caused by a picture distortion induced by the different positions of the target object in the panoramic video may be effectively avoided.

According to some embodiments, the current video frame is a panoramic video frame in which the target object that is box-selected by the creator; the plane image is a two-dimensional image which is obtained by mapping of a panoramic video image, and the playback plane image is a plane image actually played in a client, that is, a plane image that the user can view; the target object is an object to be display at the center of the playback plane image subsequently as the creator wants, and content that is box-selected by the box-selection operation is the target object; and the box-selection operation is an operation of adding a target border around the target object, that is, selecting the target object by using the target border as a box-.

In addition, the spherical coordinate system, also referred to as polar coordinates in space, is a type of three-dimensional coordinate system, which is generalized from a two-dimensional polar coordinate system and is used to determine positions of points, lines, planes, and bodies in three-dimensional space, which is composed of an azimuth, an elevation, and a radial distance by defining a reference point as origin of coordinates. In the present application, a radial distance in the spherical coordinate system is determined as a default value in advance, which is usually between 100 and 300, such as 128. In other words, the spherical coordinate system in the present application is a spherical coordinate system with a fixed spherical radius. Therefore, the reference polar coordinates in the spherical coordinate system in the present application include an azimuth and an elevation, according to which a point on the sphere (i.e., a point corresponding to the central position of the target object on the sphere) can be uniquely determined. The reference polar coordinates refer to a center of viewing angle for a plane image corresponding to a panoramic video image that is to be made by the creator.

Figure 3:
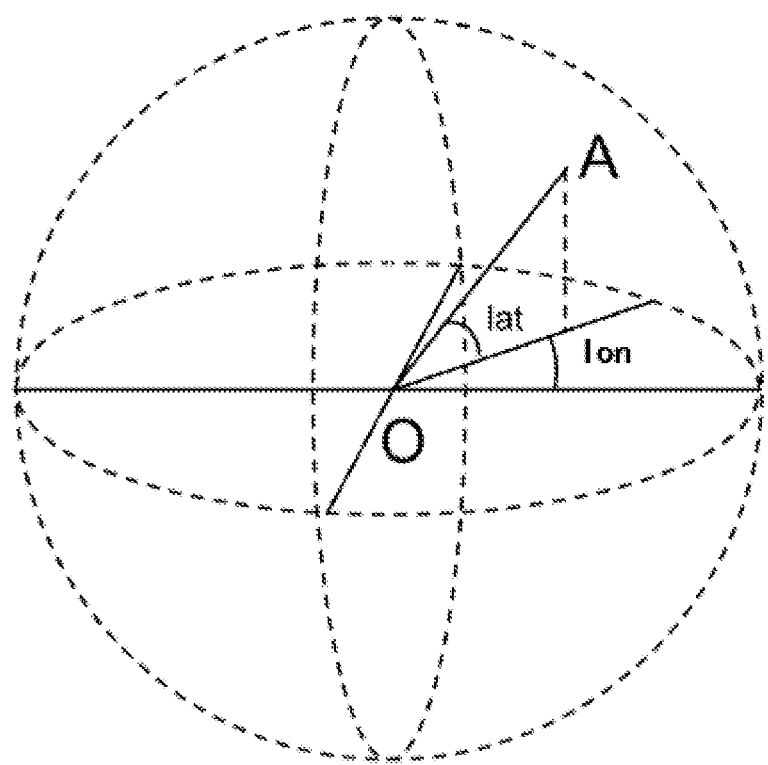
FIG. 3 is a schematic diagram illustrating a principle of a spherical polar coordinate system according to some embodiments of this application.

For example, FIG. 3 is a schematic principle diagram of a spherical coordinate system according to some embodiments of the present application. As shown in FIG. 3, lat (elevation) and lon (azimuth) are respectively representations of polar coordinates for an elevation and an azimuth of a point A in a sphere.

It should be noted that, generally, each of playback plane images of a panoramic video that users view is a generated plane picture with a center defined as a specific point on a sphere and having a viewing angle with a specific range of an elevation and of an azimuth. In the present application, the tracking of the target object is also performed based on changes of the reference polar coordinates (including an azimuth and an elevation). The elevation ranges from minus 90 degrees to plus 90 degrees, and the azimuth ranges from minus 180 degrees to plus 180 degrees.

In the present application, to fix a target object at a center of viewing angle of a playback plane image, the creator may box-select the target object, and then the target object can be automatically tracked in subsequent video frames based on reference polar coordinates (including an azimuth and an elevation) of a central position of the target object in the spherical coordinate system. The reference polar coordinates of the central position of the target object are updated to generate centers of viewing angle for consecutive tracking plane images corresponding to the clip of video, and then the clip of video is played based on the centers of viewing angle for consecutive tracking plane images.

In an optional implementation of some embodiments, before the receiving a box-selection operation for a target object at a center of a playback plane image for a current video frame, the method further includes:
  receiving a move operation of dragging the target object to the center of the playback plane image; and
  updating, based on the move operation, the playback plane image for the current video frame to a plane image with the target object located at a center of the plane image.

It should be noted that the target object that the creator wants to box-select may not be at the center of the playback plane image. In this case, the creator may first drag, in the playback plane image for the current video frame, the target object to the center of the playback plane image, and then box-select the target object at the center of the playback plane image.

In the present application, the target object to be box-selected may be first dragged to the center of the playback plane image before being box-selected, and subsequent target tracking is performed based on an object feature of the target object at the center of the playback plane image, thus a failure of subsequent target tracking due to a picture distortion induced by the other different positions of target object in the playback plane image may be avoided.

In an optional implementation of some embodiments, a specific implementation process of determining reference polar coordinates of a central position of the target object in a spherical coordinate system may be as follows:
  determining a central position of the target object in the playback plane image; and
  determining the reference polar coordinates of the central position in the spherical coordinate system based on a panoramic image of the current video frame in the spherical coordinate system and the central position.

It should be noted that, after a frame of panoramic video (i.e., a panoramic image) is projected into the spherical coordinate system, each pixel has corresponding polar coordinates in the spherical coordinate system. A plane image is a two-dimensional plane image to which a panoramic video frame is mapped, and also includes a plurality of pixels. Therefore, a pixel at the central position of the target object in the plane image may be first determined, and then polar coordinates corresponding to the pixel in the spherical coordinate system may be found. The polar coordinates are the reference polar coordinates of the central position of the target object in the spherical coordinate system.

In an optional implementation of some embodiments, after the determining reference polar coordinates of a central position of the target object in a spherical coordinate system, the method further includes:
  performing image recognition on the playback plane image for the current video frame, to determine the object feature of the target object.

It should be noted that, to track the target object in the subsequent video frames, image recognition needs to be performed on the target object that is box-selected in the current video frame, to obtain the object feature of the target object at the center of the playback plane image. During specific implementation, a tracking algorithm may be a tracking algorithm based on correlation filtering, such as a kernelized correlation filter (KCF) algorithm or a discriminative scale space tracker (DSST) (which is a filtering algorithm combining position and scale), or may be a tracking algorithm based on deep learning, such as SiamRPN or SiamFC. The present application is not limited to the specific tracking algorithm.

In an optional implementation of some embodiments, a specific implementation process of performing image recognition on the playback plane image for the current video frame may be as follows:

determining a target border corresponding to the box-selection operation;

determining a corresponding recognition region based on the target border; and performing image recognition on the corresponding recognition region of the playback plane image for the current video frame.

It should be noted that a target border may be used to box-select the target object; then part of image content greater than or equal to the target border may be selected as a recognition region, and subsequent image recognition is performed only on the recognition region.

In practical applications, an area that is box-selected by the target border may be determined, and an area several preset times of the area may be determined as the recognition region. Definitely, a length and a width of the target border may alternatively be determined, and a region with a length and a width several preset times of the length and width respectively may be determined as the recognition region. According to some embodiments, the preset times may be determined in advance, and the preset times is used to determine a region on which the image recognition is finally performed. For example, the preset times may be 1.5, 2, etc.

It should be noted that during image recognition performed on the playback plane image in the current video frame to extract the object feature of the target object, image recognition may be performed on the entire playback plane image to extract the feature. In addition, since only the object feature of the target object needs to be obtained in the end, image recognition may alternatively be performed only on a region associated with the target object. In other words, an area that is box-selected by the box-selection operation may be first determined; then an area several preset times of the area may be determined as a recognition region, and image recognition is performed only in the recognition region, without the need of performing image recognition on the entire playback plane image, as a result of which the image recognition is accelerated and the efficiency of processing the panoramic video is improved.

In the present application, after the target object that is at the center of the playback plane image of the current video is box-selected by the creator, the reference polar coordinates of the central position of the target object in the spherical coordinate system may be determined, for subsequent generating the tracking plane image for the next video frame with a center defined as the reference polar coordinate, so that subsequent target tracking is always performed according the target object located at a center of the plane image, and the corresponding panoramic video is played.

Step 204: Generate a tracking plane image for a next video frame with a center defined as the reference polar coordinates based on a panoramic image of the next video frame in the spherical coordinate system.

Specifically, on the basis of determining the reference polar coordinate of the central position of the target object in the spherical coordinate system, further, a tracking plane image for a next video frame is generated with a center defined as the reference polar coordinates based on a panoramic image of the next video frame in the spherical coordinate system. The tracking plane image is a plane image for target tracking of the target object.

In an optional implementation of some embodiments, a specific implementation process of generating with a center defined as the reference polar coordinates a tracking plane image for a next video frame based on a panoramic image of the next video frame in the spherical coordinate system may be as follows:

mapping the next video frame into the spherical coordinate system to obtain the panoramic image of the next video frame in the spherical coordinate system;

capturing a range with a preset angle of the panoramic image with the reference polar coordinates; and converting the captured panoramic image into the tracking plane image for the next video frame.

Specifically, a range with a preset angle is a preset range of an elevation and of an azimuth. For example, the elevation is 30 degrees, and the azimuth ranges is 45 degrees. It should be noted that for the generating of a tracking plane image corresponding to each video frame of the panoramic video, the range with a preset angle remains the same. In other words, a range of an elevation and of an azimuth is determined firstly, and then a tracking plane image for the first panoramic video frame and tracking plane images for all subsequent panoramic video frames are generated according to the range of the elevation and of the azimuth.

In the present application, the panoramic image of the next video frame may be projected into the spherical coordinate system, and then part of the panoramic image with a center defined as the determined reference polar coordinates may be captured, and mapped into a two-dimensional plane image, so as to obtain the tracking plane image for the next video frame. Since the tracking plane image is generated, by means of capturing, with a center defined as the reference polar coordinates of the central position of the target object in the previous video frame (the next video frame is considered as the current video frame), the target object in the next video frame is near the central position of the tracking plane image.

Step 206: Determine, based on an object feature of the target object, updated polar coordinates of the central position of the target object in the tracking plane image for the next video frame in the spherical coordinate system.

According to some embodiments, on the basis of generating the tracking plane image for the next video frame with a center defined as the reference polar coordinates based on the panoramic image of the next video frame in the spherical coordinate system, further, updated polar coordinates of the central position of the target object in the tracking plane image for the next video frame in the spherical coordinate system are determined based on an object feature of the target object.

It should be noted that an object feature of the target object at the center of a current playback plane image may be obtained by performing image recognition on the playback plane image for the current video frame. Based on the object feature, target tracking may be performed in the generated tracking plane image for the next video frame, to find a corresponding target object, and then the reference polar coordinates may be updated based on the newly determined target object.

In an optional implementation of some embodiments, a specific implementation process of determining, based on an object feature of the target object, updated polar coordinates of the central position of the target object in the tracking plane image for the next video frame in the spherical coordinate system may be as follows:

performing image recognition on the corresponding recognition region in the tracking plane image for the next video frame, to determine the central position of the target object in the next video frame; and determining the updated polar coordinates of the central position of the target object in the next video frame in the spherical coordinate system.

It should be noted that a corresponding image feature may be obtained by performing image recognition on the tracking plane image for the next video frame; then an image feature having the object feature of the target object is determined as the target object, and then updated polar coordinates of a central position of the updated target object may be determined. In practical applications, recognition may be directly performed on the entire tracking plane image for the next video frame, to obtain the corresponding image feature. Alternatively, recognition may be performed on the corresponding recognition region determined in the current video frame. In other words, image recognition is performed only in the corresponding recognition region in the tracking plane image for the next video frame.

In an optional implementation of some embodiments, a specific implementation process of performing image recognition on the corresponding recognition region in the tracking plane image for the next video frame, to determine the central position of the target object in the next video frame may be as follows:

performing image recognition on the recognition region in the tracking plane image for the next video frame, to obtain an image feature;

analyzing the image feature and the object feature, to obtain a confidence score of the presence of the target object in the recognition region, and a position offset of the image feature relative to a central position of the recognition region; and in response to determining the confidence score is greater than a confidence score threshold, determining the central position of the target object in the next video frame based on the central position of the target object in the playback plane image and the position offset.

According to some embodiments, the confidence score is also referred to as reliability, a score of confidence, or a confidence coefficient. The confidence score of the presence of the target object in the corresponding recognition region may indicate whether the target object is present in the corresponding recognition region. It should be noted that, after the image feature is obtained by performing image recognition in the corresponding recognition region in the tracking plane image for the next video frame, whether the recognized image feature is the target object that is initially box-selected needs to be determined. Therefore, the image feature and the object feature may be analyzed to determine the confidence score of the presence of the target object in the corresponding recognition region, i.e., reliability of the presence of the target object in the corresponding recognition region. During specific implementation, the image feature and the object feature may be analyzed by using different algorithms, to obtain the confidence score of the presence of the target object in the corresponding recognition region.

In a possible implementation, a similarity between the image feature and the object feature may be determined through feature comparison, so as to obtain the confidence score of the presence of the target object in the corresponding recognition region. During some implementation, the image feature may be compared with the object feature to determine the similarity between the image feature and the object feature, and the similarity may be determined as the confidence score of the presence of the target object in the corresponding recognition region.

In addition, the confidence score of the presence of the target object in the corresponding recognition region may also be obtained by performing convolution on the image feature and the object feature. Definitely, in practical applications, other tracking algorithms may be used. The image feature and the object feature are input to the tracking algorithms, to obtain the confidence score of the presence of the target object in the corresponding recognition region. This is not limited in the present application.

It should be noted that, after the image feature and the object feature are analyzed, the position offset of the image feature relative to the central position of the corresponding recognition region may also be obtained, in addition to the confidence score of the presence of the target object in the corresponding recognition region. Because the recognition region is determined based on the target object in the playback plane image for the current video frame, the central position of the recognition region may actually represent the central position of the target object in the current video frame. In addition, the image feature is a feature obtained by performing recognition on the corresponding recognition region in the next video frame, and the object feature is the object feature of the target object in the current video frame (i.e., a feature when the target object is at the central position of the image). A change of the image feature in the next video frame relative to the feature when the target object is at the central position of the image may be obtained by analyzing and comparing the image feature and the object feature. The change may represent the position offset of the image feature relative to the central position of the corresponding recognition region.

In addition, because the image feature is a feature obtained by performing image recognition on the corresponding recognition region in the tracking plane image for the next video frame, the image feature is a feature corresponding to a candidate target object. Therefore, the position offset of the image feature relative to the central position of the corresponding recognition region is a position offset of the candidate target object relative to the central position of the corresponding recognition region. When it is subsequently determined that the candidate target object is the target object in the current video frame, the position offset may represent a distance for which the target object in the next video frame has moved relative to the current video frame.

When the confidence is greater than the confidence score threshold, it indicates that the recognized image feature is highly likely to be the target object that is initially box-selected. In this case, an updated central position of the target object (i.e., the central position of the target object in the next video frame) may be obtained based on an initial central position (the central position of the target object in the playback plane image) and the position offset (i.e., the distance for which the target object has moved).

It should be noted that target tracking is performed in a new video frame (i.e., the next video frame) to determine the position of the target object in the next video frame, and then to further determine updated polar coordinates of the central position of the target object, so as to continue to generate tracking plane images of subsequent video frames and continue to track the target object.

In an optional implementation of some embodiments, after the determining the central position of the target object in the next video frame based on the central position of the target object in the playback plane image and the position offset, the method further includes:

merging the image feature and the object feature to obtain an updated object feature.

It should be noted that, after image recognition is performed on a playback plane image for an initial video frame to obtain an initial object feature of the target object at the center of the playback plane image, each recognized image feature may be compared with the initial object feature during subsequent target tracking for each video frame, so as to determine the target object. In addition, the image feature recognized each time and the previous object feature may also be fused to serve as a tracking criterion for recognizing the target object in the next video frame. In other words, the recognized image feature and the previous object feature may be fused each time, to obtain an updated object feature as a comparison criterion for target tracking in subsequent video frames.

For example, it is assumed that the initial video frame is the tenth video frame, and image recognition is performed on a playback plane image for the tenth video frame, to obtain an object feature 1 of the target object (a feature of a dog); then image recognition is performed on a tracking plane image for the eleventh video frame, and a recognized image feature 1 (a dog with a hat) and the object feature 1 are analyzed; when it is determined that a confidence score of the recognized image feature 1 relative to the object feature 1 is greater than the confidence score threshold, it indicates that the recognized image feature 1 is the target object, and in this case, the object feature 1 and the image feature 1 are merged to obtain an updated object feature 1 (a dog with a hat); then image recognition is performed on a tracking plane image for the twelfth video frame, and a recognized image feature 2 (a dog in clothes) and the updated object feature 1 are analyzed; when it is determined that a confidence score of the recognized image feature 2 relative to the updated object feature 1 is greater than the confidence score threshold, it indicates that the recognized image feature 2 is the target object, and in this case, the object feature 2 and the updated object feature 1 are merged to obtain an updated object feature 2 (a dog with a hat and in clothes); and so on.

Step 208: determining the updated polar coordinates as the reference polar coordinates to return to perform the step 204, until determining a tracking stop condition is met, so as to obtain a sequence of reference polar coordinates corresponding to a sequence of frames from the current video frame to a target video frame, where the target video frame is a video frame in response to determining the tracking stop condition is met.

According to some embodiments, on the basis of determining, based on the object feature of the target object, the updated polar coordinates of the central position of the target object in the tracking plane image for the next video frame in the spherical coordinate system, further, the updated polar coordinates are determined as the reference polar coordinates, and the process returns to the operation step in step 104, until determining that a tracking stop condition is met, so as to obtain a sequence of reference polar coordinates corresponding to the sequence of frames from the current video frame to a target video frame, where the target video frame is a video frame in response to determining the tracking stop condition is met.

The tracking stop condition is a condition indicating that target tracking fails. When the tracking stop condition is met, it indicates that target tracking fails, and the target object may be no longer present in the current tracking plane image. Therefore, tracking is stopped, and a series of reference polar coordinates (i.e., the sequence of reference polar coordinates) are output. The series of reference polar coordinates represent centers of viewing angle of tracking plane images for the sequence of frames from the current video frame to the target video frame. In other words, the plane images for the sequence of frames from the current video frame to the target video frame may be played subsequently with the series of reference polar coordinates as the centers of the tracking plane images.

It should be noted that after the updated polar coordinates are determined, the process may return to processing of the next video frame. According to the foregoing operation step in step 104, a tracking plane image for the next video frame is generated, the updated polar coordinates are determined, and then the updated polar coordinates are determined as the reference polar coordinates. The process then continues to process a next video frame in a cyclic manner until determining that the tracking stop condition is met, so as to obtain a consecutive sequence of reference polar coordinates corresponding to a clip of video. The consecutive sequence of reference polar coordinates may provide a reference for subsequent playback of the clip of video.

In an optional implementation of some embodiments, a specific implementation process of the determining the tracking stop condition is met may be as follows:

in response to determining the confidence score of the presence of the target object in the recognition region is less than the confidence score threshold, determining that the tracking stop condition is met.

According to some embodiments the confidence score threshold is a preset value used to determine whether the confidence score of the presence of the target object in the corresponding recognition region is too low, that is, to determine whether the target object is still present in the corresponding recognition region. For example, the confidence score threshold may be 50, 60, etc.

It should be noted that a corresponding image feature may be obtained by performing image recognition on the tracking plane image for the next video frame, and a confidence score of the presence of the target object in the recognition region may be obtained by analyzing the image feature and the object feature. If the confidence is greater than the confidence score threshold, it indicates that the target object is still present in the recognition region, and in this case, target tracking is normal, and the tracking for a next frame may be continued. However, if the confidence is less than the confidence score threshold, it indicates that the target object is no longer present in the corresponding recognition region, and in this case, target tracking is lost, the tracking stop condition is met, and the tracking is no longer performed.

In an optional implementation of some embodiments, after the obtaining a sequence of reference polar coordinates corresponding to a sequence of frames from the current video frame to a target video frame, the method further includes:

smoothing and filtering the reference polar coordinates corresponding to the sequence of frames from the current video frame to the target video frame, to obtain a sequence of smoothed and filtered reference polar coordinates; and determining the sequence of smoothed and filtered reference polar coordinates as centers of playback plane images for playing the sequence of frames from the current video frame to the target video frame.

During practical implementation, after the sequence of reference polar coordinates corresponding to the sequence of frames from the current video frame to the target video frame is obtained, the series of reference polar coordinates may be input to a filter for smoothing and filtering. The filter may be a filter for mean filtering, median filtering, etc. Definitely, in practical applications, other filters capable of performing smoothing and filtering on a series of data may also be the filter, which is not limited in the present application.

In the present application, smoothing and filtering may be first performed on the obtained sequence of reference polar coordinates corresponding to the sequence of frames from the current video frame to the target video frame, and then the sequence of processed reference polar coordinates are determined as the centers of the playback plane images, that is, the centers of the playback plane images are determined as the centers of smoothed reference polar coordinates, for playing the sequence of frames from the current video frame to the target video frame, so that the clip of panoramic video is played, as a result of which the viewing angle from shaking during the playing is prevented.

It should be noted that steps 202 to 208 above are directed to making, for one target object, a plane image with the target object as a center, to play the panoramic video. In practical applications, the foregoing operations may be repeated, and different target objects may be selected to provide different playback viewing angles for a viewer to choose. The panoramic video viewer may independently select a default viewing angle when opening a video for browsing, or may change a viewing angle by manually dragging the viewing angle according to their own preference, and then can switch back to the default playback viewing angle customized by the creator.

For example, the target object is a "dog". In this case, a plane image with the "dog" located at a center of playback viewing angle for it may be obtained by performing the operation steps in steps 202 to 204 above, and when viewing this clip of video, the viewer may see that the "dog" is always at the center of the plane images. Alternatively, the target object may be a "cat". In this case, a plane image with the "cat" located at a center of playback viewing angle for it may also be obtained by performing the operation steps in steps 202 to 204 above, and when viewing this clip of video, the viewer may see that the "cat" is always at the center of the plane images.

According to the method of processing panoramic video data provided in the present application, upon receiving a box-selection operation for a target object that is at the center of a playback plane image for a current video frame, reference polar coordinates of a central position of the target object in a spherical coordinate system are determined; a tracking plane image for a next video frame with a center defined as the reference polar coordinates is generated based on a panoramic image of the next video frame in the spherical coordinate system; updated polar coordinates of the central position of the target object in the tracking plane image for the next video frame in the spherical coordinate system are determined based on an object feature of the target object; and the updated polar coordinates are determined as the reference polar coordinates to return to the operation step of generating a tracking plane image for a next video frame with a center defined as the reference polar coordinates based on a panoramic image of the next video frame in the spherical coordinate system, until determining that a tracking stop condition is met, so as to obtain a sequence of reference polar coordinates corresponding to a sequence of frames from the current video frame to a target video frame, where the target video frame is a video frame in response to determining the tracking stop condition is met.

In this case, after box-selecting the target object that is at the center of the playback plane image of the current video by the creator, the reference polar coordinates of the central position of the target object in the spherical coordinate system may be determined as the center of the tracking plane image for the next video frame to be generated, so that the corresponding panoramic video is played always with the target object located at the center of the corresponding panoramic video. In other words, once the creator box-selects the target object, the tracking plane image with the target object located at the center can be automatically generated for target tracking. For the target object, centers of viewing angle for consecutive tracking plane images can be automatically generated, without need of processing the panoramic video frame by frame by the creator, which greatly improves efficiency of processing the panoramic video. In addition, as, for the target object that is box-selected, the target object in the panoramic video is tracked based on the spherical coordinate system, a tracking failure that is caused by a picture distortion induced by different positions of the target object in the panoramic video may be effectively avoided, and thereby the accuracy and success rate of target tracking may be improved, and improving panoramic video processing and playback effects may be improved.

Figure 4:
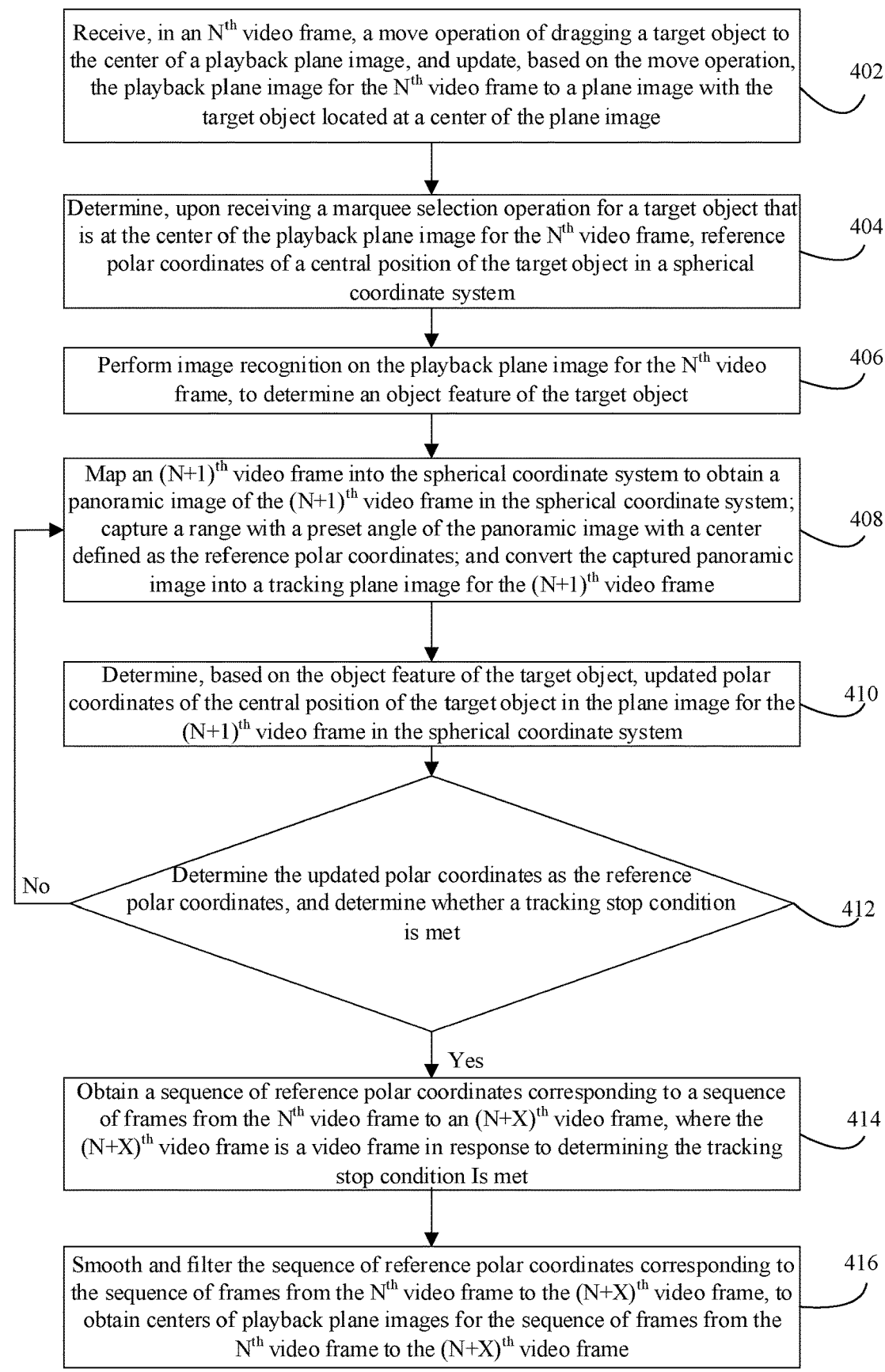
FIG. 4 is a flowchart illustrating a panoramic video data processing method according to some embodiments of this application.

FIG. 4 is a flowchart of another method of processing panoramic video data according to some embodiments of the present application, which specifically includes the steps as follows.

Step 402: Receive, in an $N^{th}$ video frame, a move operation of dragging a target object to the center of a playback plane image, and update, based on the move operation, the playback plane image for the $N^{th}$ video frame to a plane image with the target object located at a center of the plane image.

Step 404: Determine, upon receiving a box-selection operation for a target object that is at the center of the playback plane image for the $N^{th}$ video frame, reference polar coordinates of a central position of the target object in a spherical coordinate system.

Step 406: Perform image recognition on the playback plane image for the $N^{th}$ video frame, to determine an object feature of the target object.

Step 408: Map an $(N+1)^{th}$ video frame into the spherical coordinate system to obtain a panoramic image of the $(N+1)^{th}$ video frame in the spherical coordinate system; capture a range with a preset angle of the panoramic image with a center defined as the reference polar coordinates; and convert the captured panoramic image into a tracking plane image for the $(N+1)^{th}$ video frame.

Step 410: Determine, based on the object feature of the target object, updated polar coordinates of the central position of the target object in the plane image for the $(N+1)^{th}$ video frame in the spherical coordinate system.

Step 412: Determine the updated polar coordinates as the reference polar coordinates, and determine whether a tracking stop condition is met. If yes, step 314 is performed; otherwise, the process returns to step 308.

Step 414: Obtain a sequence of reference polar coordinates corresponding to a sequence of frames from the $N^{th}$ video frame to an $(N+X)^{th}$ video frame, where the $(N+X)^{th}$ video frame is a video frame in response to determining the tracking stop condition is met.

Step 416: Smooth and filter the sequence of reference polar coordinates corresponding to the sequence of frames from the $N^{th}$ video frame to the $(N+X)^{th}$ video frame, to obtain centers of playback plane images for the sequence of frames from the $N^{th}$ video frame to the $(N+X)^{th}$ video frame.

According to the panoramic video data processing method provided in the present application, after box-selecting the target object that is at the center of the playback plane image of the current video by the creator, the reference polar coordinates of the central position of the target object in the spherical coordinate system may be determined as a center of generating the tracking plane image for the next video frame to be generated, so that the corresponding panoramic video is played always with the target object located at the center of the corresponding panoramic video. In other words, once the creator box-selects the target object, the tracking plane image with the target object located at the center can be automatically generated for target tracking. For the target object, centers of viewing angle for consecutive tracking plane images can be automatically generated without need of processing the panoramic video frame by frame by the creator, which greatly improves efficiency of processing the panoramic video. In addition, as, for the target object that is box-selected, the target object in the panoramic video is tracked based on the spherical coordinate system, a tracking failure that is caused by a picture distortion induced by different positions of the target object in the panoramic video, thereby the accuracy and success rate of target tracking may be improved, and panoramic video processing and playback effects may be improved.

The foregoing describes a schematic solution of a panoramic video data processing method in the embodiments. It is worthwhile to note that the technical solution of the panoramic video data processing method shown in FIG. 4 and the technical solution of the panoramic video data processing method shown in FIG. 2 belong to the same concept. For details not described in the technical solution of the panoramic video data processing method shown in FIG. 4, references can be made to the descriptions of the technical solution of the panoramic video data processing method shown in FIG. 2.

According to some embodiments, the method of processing panoramic video data further includes:

in response to receiving a box-selection operation for a target object in a current video frame, determining initial polar coordinates of a central position of the target object in a spherical polar coordinate system; and wherein the determining an object feature corresponding to the target object comprises:

determining, based on the initial polar coordinates and reference polar coordinates of a central position of a play plane image of the current video frame, an object feature corresponding to the target object at the central position.

According to the method provided in this application, after a user box-selects the target object in the current video frame, the initial polar coordinates of the central position of the target object in the spherical polar coordinate system may be determined. Then the target object is moved to the central position of the play plane image, the object feature of the target object at the central position is determined for subsequent target tracking, and the reference polar coordinates of the central position of the play plane image are used as the center for generating the tracking plane image of the next video frame, so that target tracking is always performed by using the target object as a center, and a corresponding panoramic video is played. In other words, provided that the user box-selects the target object at any position, a tracking plane image centered on the target object can be automatically generated, and continuous tracking plane image angle-of-view centers can be automatically generated for the target object, without requiring the user to constantly drag the panoramic video, so that processing efficiency of the panoramic video is greatly improved, and viewing experience of the panoramic video is improved. In addition, the box-selected target object in the panoramic video is tracked based on the spherical polar coordinate system, which can effectively avoid a tracking failure caused by image distortion of the target object at different positions in the panoramic video, thereby increasing accuracy and a success rate of tracking the target object and improving a processing effect and a play effect of the panoramic video. The foregoing is merely illustrative and various modifications can be made to the described embodiments. The foregoing embodiments may be implemented individually or in any combination.

It should be noted that although technical features, characteristics, elements are described along with the one or more specific embodiments, those skilled in the art can apply them, either alone or in combination, to all of the embodiments described in the present application.

Figure 5:
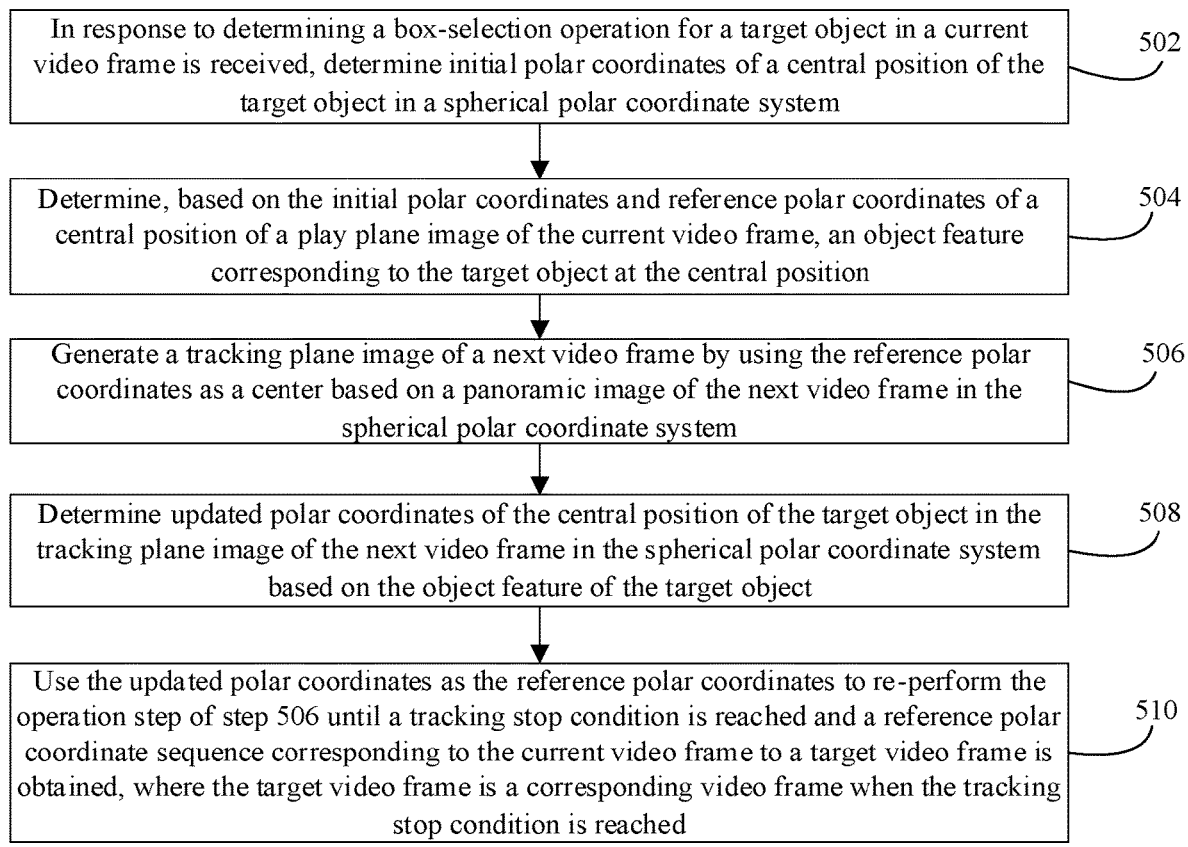
FIG. 5 is a flowchart illustrating a panoramic video data processing method according to some embodiments of this application.

FIG. 5 is a flowchart illustrating a panoramic video data processing method according to some embodiments of this application. The method includes the following steps.

Step 502: When a box-selection operation for a target object in a current video frame is received, determine initial polar coordinates of a central position of the target object in a spherical polar coordinate system.

In practice, when a panoramic video is shot, an object or a target that needs to be focused is not fixed at a certain angle of view because the panoramic video can cover a 360-degree angle of view. In addition, when the panoramic video is played, image content of the 360-degree angle of view cannot be completely displayed on a play apparatus at a time, and a user needs to select an appropriate viewing angle. The viewing angle is an image play angle of the current video. In other words, when the user watches the panoramic video, the user needs to constantly drag the viewing angle to view desired content, which is relatively troublesome and leads to poor viewing experience of the panoramic video.

In addition, currently, when the panoramic video is processed frame by frame, the panoramic video is usually directly decoded into a frame sequence image, and then target tracking is directly performed on the original panoramic image frame by frame. Because image distortion of the target at different positions of the original panoramic image may occur, the target object may fail to be tracked.

Therefore, to improve viewing experience of the panoramic video, processing efficiency of the panoramic video, and a success rate of tracking the target object, this application provides a panoramic video data processing method. When a box-selection operation for a target object in a current video frame is received, initial polar coordinates of a central position of the target object in a spherical polar coordinate system are determined. An object feature corresponding to the target object at the central position is determined based on the initial polar coordinates and reference polar coordinates of a central position of a play plane image of the current video frame. A tracking plane image of a next video frame is generated by using the reference polar coordinates as a center based on a panoramic image of the next video frame in the spherical polar coordinate system. Updated polar coordinates of the central position of the target object in the tracking plane image of the next video frame in the spherical polar coordinate system are determined based on the object feature of the target object. The updated polar coordinates are used as the reference polar coordinates to re-perform the operation step of generating a tracking plane image of a next video frame by using the reference polar coordinates as a center based on a panoramic image of the next video frame in the spherical polar coordinate system, until a tracking stop condition is reached and a reference polar coordinate sequence corresponding to the current video frame to a target video frame is obtained. The target video frame is a corresponding video frame when the tracking stop condition is reached. As such, provided that a user box-selects the target object at any position, a tracking plane image centered on the target object can be automatically generated, and continuous tracking plane image angle-of-view centers can be automatically generated for the target object, without requiring the user to constantly drag the panoramic video, so that processing efficiency of the panoramic video is greatly improved, and viewing experience of the panoramic video is improved. In addition, the box-selected target object in the panoramic video is tracked based on the spherical polar coordinate system, which can effectively avoid a tracking failure caused by image distortion of the target object at different positions in the panoramic video.

According to some embodiments, the current video frame is a panoramic video frame in which the user box-selects the target object. The plane image is a two-dimensional image obtained by mapping the panoramic video image. The target object is an object that the user wants to subsequently display at the center of the plane image, and box-selected content is the target object. The box-selection operation is an operation of adding a target box outside the target object, that is, using the target box to box-select the target object. In actual implementation, the user may pause play of the panoramic video, and then randomly box-select the target object in a plane image of the current video frame.

In addition, the spherical polar coordinate system is also referred to as space polar coordinates, and is a type of three-dimensional coordinate system. The spherical polar coordinate system is extended from a two-dimensional polar coordinate system to determine positions of a point, a line, a plane, and a volume in three-dimensional space. The spherical polar coordinate system is formed by an azimuth angle, an elevation angle, and a radius distance by using a coordinate origin as a reference point. In this application, the radius distance in the spherical polar coordinate system is preset to a default value, and is usually set to a value ranging from 100 to 300, for example, 128. In other words, in this application, the spherical polar coordinate system describes spherical polar coordinates with a fixed spherical radius. Therefore, the initial polar coordinates (reference polar coordinates) in the spherical polar coordinate system in this application include an azimuth angle and an elevation angle, and a point on a sphere (namely, a point corresponding to the central position of the target object on the sphere) can be uniquely determined by using the azimuth angle and the elevation angle. The initial polar coordinates are polar coordinates of the central position of the target object box-selected by the user.

It is worthwhile to note that a plane image of a panoramic video viewed by the user is usually a plane image generated by using a certain point on the sphere as a center and a elevation angle and azimuth angle as an angle of view. In this application, the target object is also tracked based on a change of the reference polar coordinates (azimuth and elevation angles). The elevation angle ranges from +90 degrees to −90 degrees, and the azimuth angle ranges from +180 degrees to −180 degrees.

In this application, when the user needs to permanently use a certain target object as a plane image angle-of-view center, the user may box-select the target object. Subsequently, the target object may be automatically tracked in a subsequent video frame based on initial polar coordinates (azimuth and elevation angles) of a central position of the target object in a spherical polar coordinate system, and reference polar coordinates of the central position may be updated, to generate continuous plane image angle-of-view centers corresponding to the video and play the video by using the continuous plane image angle-of-view centers.

In an optional implementation of some embodiments, the initial polar coordinates of the central position of the target object in the spherical polar coordinate system may be determined through the following process:

determining the central position of the target object in a play plane image of the current video frame; and determining the initial polar coordinates of the central position in the spherical polar coordinate system based on a panoramic image of the current video frame in the spherical polar coordinate system and the central position.

It is worthwhile to note that the play plane image is a plane image actually played by a client, namely, a plane image that can be seen by the user. After a certain panoramic video frame (namely, panoramic image) is projected into the spherical polar coordinate system, each pixel has corresponding polar coordinates in the spherical polar coordinate system. Because the plane image is a two-dimensional plane image obtained by mapping a certain panoramic video frame, and the plane image also includes multiple pixels, a pixel at the central position of the target object in the plane image may be first determined, and then polar coordinates corresponding to the pixel in the spherical polar coordinate system are found. The polar coordinates are the initial polar coordinates of the central position of the target object in the spherical polar coordinate system.

Step 504: Determine, based on the initial polar coordinates and reference polar coordinates of a central position of a play plane image of the current video frame, an object feature corresponding to the target object at the central position.

According to some embodiments, in addition to determining the initial polar coordinates of the central position of the target object in the spherical polar coordinate system when the box-selection operation for the target object of the current video frame is received, the object feature corresponding to the target object at the central position is determined based on the initial polar coordinates and the reference polar coordinates of the central position of the play plane image of the current video frame.

It is worthwhile to note that, unlike the manner in which play angles are edited in advance for the panoramic video for the user to select, during play, the user usually randomly box-selects the target object based on the user's preferences without necessarily referring to original intentions of the creator. In addition, it is difficult to restrict the user's box-selection behavior, and the user may box-select the edge of the play plane image instead of the central position. Therefore, after the user box-selects the target object, the object feature of the target object at the central position of the play plane image needs to be determined based on a current position of the target object in the play plane image. In subsequent target tracking, the object feature of the target object at the center of the play plane image may be used as a tracking standard.

In addition, after the target object is moved to the central position of the play plane image, polar coordinates of the central position of the target object are actually polar coordinates of the central position of the play plane image. Therefore, the polar coordinates of the central position of the play plane image may be determined as reference polar coordinates for generating a tracking plane image of a next video frame.

In an optional implementation of some embodiments, the object feature corresponding to the target object at the central position may be determined based on the initial polar coordinates and the reference polar coordinates of the central position of the play plane image of the current video frame through the following process:

determining center polar coordinates of the central position of the play plane image of the current video frame in the spherical polar coordinate system;

performing interpolation based on the initial polar coordinates and the center polar coordinates to obtain a preset quantity of intermediate polar coordinates; and determining the object feature corresponding to the target object at the central position based on the intermediate polar coordinates and the initial polar coordinates.

It is worthwhile to note that the target object may not be located at the center of the play plane image when the user box-selects the target object. When the target object is relatively far away from the central position of the play plane image, the target object may be distorted if the target object is directly moved to the central position of the play plane image. Therefore, the target object needs to be slowly moved from the box-selected initial position to the central position of the play plane image through interpolation, and then the object feature of the target object at the central position is determined.

In an optional implementation of some embodiments, the object feature corresponding to the target object at the central position may be determined based on the intermediate polar coordinates and the initial polar coordinates through the following process:

sequentially arranging the intermediate polar coordinates and the initial polar coordinates to obtain a polar coordinate set;

performing image recognition on the play plane image of the current video frame to determine an object feature of the target object;

generating a tracking plane image of the current video frame by using the ith polar coordinates in the polar coordinate set as a center based on a panoramic image of the current video frame in the spherical polar coordinate system, where i is equal to 1; and incrementing i by 1 and using the tracking plane image as the play plane image to re-perform the operation step of performing image recognition on the play plane image of the current video frame to obtain an object feature of the target object until i is equal to a quantity of polar coordinates included in the polar coordinate set, to obtain the object feature corresponding to the target object at the central position.

According to some embodiments, the tracking plane image is a plane image used to perform target tracking on the target object. In addition, the sequentially arranging the intermediate polar coordinates and the initial polar coordinates to obtain a polar coordinate set means arranging the interpolated intermediate polar coordinates in ascending order of distances between the intermediate polar coordinates and the center polar coordinates and then arranging the initial polar coordinates to obtain the polar coordinate set. In other words, the first polar coordinates in the polar coordinate set are polar coordinates at the smallest distance from the center polar coordinates, and the last polar coordinates in the polar coordinate set are polar coordinates (namely, the initial polar coordinates) at the largest distance from the center polar coordinates.

In actual implementation, the center of the target object needs to be moved from the current initial polar coordinates to the center polar coordinates of the central position of the current play plane image. In other words, interpolation starts from the center polar coordinates and ends at the initial polar coordinates. Interpolation is performed based on the initial polar coordinates and the center polar coordinates. For example, values between the initial polar coordinates and the center polar coordinates are evenly divided into a preset quantity of parts to obtain multiple interpolated intermediate polar coordinates. The interpolated intermediate polar coordinates and the final initial polar coordinates are sequentially used as centers to generate corresponding tracking plane images until the last tracking plane image centered on the initial polar coordinates, namely, a plane image in which the target object is located at the center of the play plane image of the current video frame, is obtained. Image recognition is performed on the tracking plane image centered on the initial polar coordinates to obtain the object feature of the target object at the central position of the play plane image of the current video frame. In addition, an interpolation parameter, that is, how many parts the values between the initial polar coordinates and the center polar coordinates are evenly divided, may be determined based on the lager one of the difference values between the two polar coordinates.

For example, the center polar coordinates are (0, 0), and the initial polar coordinates are (50, 80), in other words, interpolation starts from (0, 0) and ends at (50, 80). In this case, assuming that the preset interpolation parameter is 20, 80 to 0 need to be evenly divided into 20 parts, and 50 to 0 need to be evenly divided into 20 parts, to obtain intermediate polar coordinates {(2.5, 4), (5, 8), . . . , (45, 72), and (47.5, 76)}. Therefore, a polar coordinate set obtained is {(2.5, 4), (5, 8), . . . , (45, 72), (47.5, 76), (50, 80)}.

Image recognition is performed on a play plane image of a current video frame (namely, a plane image in which polar coordinates of the central position are (0, 0)) to obtain an object feature of the target object. Then a tracking plane image of the current video frame is generated by using (2.5, 4) as a center based on a panoramic image of the current video frame in the spherical polar coordinate system, and the tracking plane image is used as the play plane image for image recognition to obtain an object feature of the target object. Then a tracking plane image of the current video frame is generated by using (5, 8) as a center, and the tracking plane image is used as the play plane image for image recognition to obtain an object feature of the target object. By analogy, a tracking plane image of the current video frame is generated by using (50, 80) as a center, and image recognition is performed on the tracking plane image to obtain an object feature of the target object at a central position of the play plane image of the current video frame.

In an optional implementation of some embodiments, the performing image recognition on the play plane image of the current video frame to determine an object feature of the target object includes:

determining a target box corresponding to the box-selection operation;

determining a corresponding recognition region based on the target box; and performing image recognition on the corresponding recognition region in the play plane image of the current video frame to determine the object feature of the target object.

It is worthwhile to note that a target box may be used to box-select the target object, then some image content greater than or equal to the target box may be selected as a recognition region based on the target box, and image recognition is subsequently performed only on the corresponding recognition region.

In practice, an area box-selected by the target box may be determined, and a region whose area is a preset multiple of the area is determined as the corresponding recognition region. Certainly, a length and a width of the target box may be determined, and a region whose length and width are a preset multiple of the length and the width is determined as the corresponding recognition region. Specifically, the preset multiple may be preset. The preset multiple is used to determine a region in which image recognition is finally to be performed. For example, the preset multiple may be 1.5 or 2.

It is worthwhile to note that, to track the target object in a subsequent video frame, image recognition needs to be performed on the target object box-selected in the current video frame to obtain the object feature of the target object at the center of the play plane image. In specific implementation, a tracking algorithm may be a correlation filter-based tracking algorithm such as kernel correlation filter (KCF) or discriminative scale space tracker (DSST), or may be a deep learning-based tracking algorithm such as SiamRPN or SiamFC. A specific tracking algorithm is not limited in this application.

In addition, when image recognition is performed on the play plane image of the current video frame to extract the object feature of the target object, image recognition may be performed on the whole play plane image to extract the feature. In addition, because only the object feature of the target object finally needs to be obtained, image recognition may be performed only on a region near the target object. For example, a box-selected area may be first determined, then a region whose area is a preset multiple of the area may be determined as a recognition region, and image recognition is performed only on the corresponding recognition region without performing image recognition on the whole play plane image, so that a speed of image recognition is increased, thereby improving processing efficiency of the whole panoramic video.

In this application, after the user box-selects the target object at any position in the play plane image of the current video frame, the object feature of the target object at the central position of the play plane image may be determined based on a current position of the target object in the play plane image. In subsequent target tracking, the object feature of the target object at the center of the play plane image may be used as a tracking standard.

Step 506: Generate a tracking plane image of a next video frame by using the reference polar coordinates as a center based on a panoramic image of the next video frame in the spherical polar coordinate system.

Specifically, in addition to determining, based on the initial polar coordinates and the reference polar coordinates of the central position of the play plane image of the current video frame, the object feature corresponding to the target object at the central position, the tracking plane image of the next video frame is generated by using the reference polar coordinates as the center based on the panoramic image of the next video frame in the spherical polar coordinate system.

In an optional implementation of some embodiments, the tracking plane image of the next video frame may be specifically generated by using the reference polar coordinates as the center based on the panoramic image of the next video frame in the spherical polar coordinate system through the following process:

mapping the next video frame to the spherical polar coordinate system to obtain the panoramic image of the next video frame in the spherical polar coordinate system;

capturing the panoramic image within a range of a preset angle by using the reference polar coordinates as a center; and converting the captured panoramic image into the tracking plane image of the next video frame.

Specifically, the range of the preset angle refers to a elevation angle and azimuth angle predetermined. For example, the elevation angle is 30 degrees, and the azimuth angle is degrees. It is worthwhile to note that the range of the preset angle remains the same when a tracking plane image corresponding to each video frame of the panoramic video is generated. In other words, an elevation angle and azimuth angle range is first preset as the field of view, a tracking plane image of the first panoramic video frame is generated based on the elevation angle and azimuth angle range, and a tracking plane image of each subsequent panoramic video frame is generated based on the elevation angle and azimuth angle range.

In this application, a panoramic image of the next video frame may be projected into the spherical polar coordinate system, then a specific panoramic image is captured by using the determined reference polar coordinates as the center, and the panoramic image is mapped to a two-dimensional plane image to obtain the tracking plane image of the next video frame. Because the tracking plane image is captured by using reference polar coordinates of a central position of the target object in a previous video frame as a center (the next video frame is considered as a current video frame), the target object in the next video frame is still located near a central position of the tracking plane image.

In an optional implementation of some embodiments, after the tracking plane image of the next video frame is generated by using the reference polar coordinates as the center based on the panoramic image of the next video frame in the spherical polar coordinate system, the method further includes:

performing shot boundary detection on the tracking plane image of the next video frame; and determining a confidence indicating how likely the next video frame belongs to a current shot.

Specifically, the confidence is also referred to as reliability, a confidence level, or a confidence coefficient. The shot boundary detection means detecting whether a shot corresponding to the next video frame is still the current shot, in other words, whether the shot of the video changes. The confidence indicating how likely the next video frame belongs to the current shot is credibility indicating how likely the shot corresponding to the next video frame is still the current shot.

It is worthwhile to note that a video includes multiple scenes, each scene includes multiple shots, each shot includes multiple frames, and the frame is the smallest unit of the video, namely, each static image. When the shot of the video changes, the target object may also change. For example, when the shot is switched to from a sports field to a classroom, the target object "dog" disappears. Therefore, in this application, it can be learned whether the current shot changes by using the confidence indicating how likely the next video frame belongs to the current shot, which is used as a condition for determining whether to stop tracking.

In this application, during play of the panoramic video, the user cannot know a shot segmentation position in advance. Therefore, shot boundary detection needs to be performed on the plane image to determine whether the shot changes, which helps subsequently determine whether to stop tracking the target object.

Step 508: Determine updated polar coordinates of the central position of the target object in the tracking plane image of the next video frame in the spherical polar coordinate system based on the object feature of the target object.

Specifically, in addition to generating the tracking plane image of the next video frame by using the reference polar coordinates as the center based on the panoramic image of the next video frame in the spherical polar coordinate system, the updated polar coordinates of the central position of the target object in the tracking plane image of the next video frame in the spherical polar coordinate system are determined based on the object feature of the target object.

It is worthwhile to note that image recognition may be performed on the play plane image of the current video frame to obtain the object feature of the target object at the center of the current play plane image, target tracking may be performed in the generated tracking plane image of the next video frame based on the object feature, to find a corresponding target object, and then the reference polar coordinates may be updated based on the newly determined target object.

In an optional implementation of some embodiments, the updated polar coordinates of the central position of the target object in the tracking plane image of the next video frame in the spherical polar coordinate system are specifically determined based on the object feature of the target object through the following process:

performing image recognition on the corresponding recognition region in the tracking plane image of the next video frame to determine the central position of the target object in the next video frame; and determining the updated polar coordinates of the central position of the target object in the next video frame in the spherical polar coordinate system.

It is worthwhile to note that image recognition may be performed on the tracking plane image of the next video frame to obtain a corresponding image feature, then an object corresponding to an image feature that has an object feature of a target object may be determined as a target object, and then updated polar coordinates of a central position of the updated target object may be determined. In practice, recognition may be directly performed on the whole tracking plane image of the next video frame to obtain a corresponding image feature, or recognition may be performed on the corresponding recognition region determined based on the current video frame, in other words, image recognition may be performed only on the corresponding recognition region in the tracking plane image of the next video frame.

In an optional implementation of some embodiments, image recognition may be specifically performed on the corresponding recognition region in the tracking plane image of the next video frame to determine the central position of the target object in the next video frame through the following process:

performing image recognition on the corresponding recognition region in the tracking plane image of the next video frame to obtain an image feature;

analyzing the image feature and the object feature to obtain a confidence of the existence of the target object in the corresponding recognition region and a position offset of the image feature relative to a central position of the corresponding recognition region; and when the confidence is greater than a confidence threshold, determining the central position of the target object in the next video frame based on a central position of the target object in the play plane image and the position offset.

Specifically, the confidence is also referred to as reliability, a confidence level, or a confidence coefficient. The confidence of the existence of the target object in the corresponding recognition region may indicate whether the target object exists in the corresponding recognition region. It is worthwhile to note that, after image recognition is performed on the corresponding recognition region in the tracking plane image of the next video frame to obtain the image feature, it is necessary to determine whether the recognized image feature is the initially box-selected target object. Therefore, the image feature and the object feature may be analyzed to determine the confidence of the existence of the target object in the corresponding recognition region, namely, reliability of the existence of the target object in the corresponding recognition region. In specific implementation, the image feature and the object feature may be analyzed by using different algorithms to obtain the confidence of the existence of the target object in the corresponding recognition region.

In a possible implementation, a similarity between the image feature and the object feature may be determined through feature comparison to obtain the confidence of the existence of the target object in the corresponding recognition region. In specific implementation, the image feature and the object feature may be compared to determine the similarity between the image feature and the object feature, and the similarity may be determined as the confidence of the existence of the target object in the corresponding recognition region.

In addition, alternatively, the image feature and the object feature may be convoluted to obtain the confidence of the existence of the target object in the corresponding recognition region. Certainly, in practice, another tracking algorithm may be used, and the image feature and the object feature are input into the tracking algorithm to obtain the confidence of the existence of the target object in the corresponding recognition region. This is not limited in this application.

It is worthwhile to note that, through analysis on the image feature and the object feature, the position offset of the image feature relative to the central position of the corresponding recognition region may be obtained in addition to the confidence of the existence of the target object in the corresponding recognition region. Because the corresponding recognition region is determined based on the target object in the play plane image of the current video frame, the central position of the corresponding recognition region may actually represent the central position of the target object in the current video frame. In addition, the image feature is a feature recognized in the corresponding recognition region in the next video frame, and the object feature is an object feature of the target object in the current video frame (namely, a feature of the target object at the central position of the image). A change of the image feature in the next video frame relative to the feature of the target object at the central position of the image may be obtained by analyzing and comparing the image feature and the object feature, and the change may represent the position offset of the image feature relative to the central position of the corresponding recognition region.

In addition, because the image feature is a feature obtained by performing image recognition on the corresponding recognition region in the tracking plane image of the next video frame, the image feature is a feature corresponding to a candidate target object, and the position offset of the image feature relative to the central position of the corresponding recognition region is a position offset of the candidate target object relative to the central position of the corresponding recognition region. When it is subsequently determined that the candidate target object is the target object in the current video frame, the position offset may represent a moving distance of the target object in the next video frame relative to the current video frame.

When the confidence is greater than the confidence threshold, it is very likely that the recognized image feature is the initially box-selected target object. In this case, the updated central position of the target object (namely, the central position of the target object in the next video frame) may be obtained based on the initial central position (the central position of the target object in the play plane image) and the position offset (namely, the moving distance of the target object).

It is worthwhile to note that target tracking is performed on a new video frame (namely, the next video frame) to determine a position of the target object in the next video frame, and then the updated polar coordinates of the central position of the target object are further determined, which helps continue to generate a plane image of a subsequent video frame and to track the target object.

In an optional implementation of some embodiments, after the central position of the target object in the next video frame is determined based on the central position of the target object in the play plane image and the position offset, the method further includes:

merging the image feature and the object feature to obtain an updated object feature.

It is worthwhile to note that, when target tracking is subsequently performed on each video frame after image recognition is performed on a play plane image of an initial video frame to obtain an initial object feature of the target object at the center of the play plane image, each recognized image feature and the initial object feature may be compared to determine the target object. In addition, each recognized image feature and a previous object feature may be fused, and a fused feature may be used as a tracking standard for recognizing the target object in a next video frame, in other words, each recognized image feature and the previous object feature may be fused to obtain an updated object feature, and the updated object feature may be used as a comparison standard for target tracking in a subsequent video frame.

For example, assuming that the initial video frame is the tenth video frame, image recognition is performed on a play plane image of the tenth video frame to obtain an object feature 1 of the target object (a feature of a dog). Then image recognition is performed on a tracking plane image of the eleventh video frame, and a recognized image feature 1 (a dog wearing a hat) and the object feature 1 are analyzed. When it is determined that a confidence between the recognized image feature 1 and the object feature 1 is greater than the confidence threshold, an object corresponding to the recognized image feature 1 is the target object. In this case, the object feature 1 and the image feature 1 are fused to obtain an updated object feature 1 (a dog wearing a hat). Then image recognition is performed on a tracking plane image of the twelfth video frame, and a recognized image feature 2 (a dog wearing clothes) and the updated object feature 1 are analyzed. When it is determined that a confidence between the recognized image feature 2 and the updated object feature 1 is greater than the confidence threshold, an object corresponding to the recognized image feature 2 is the target object. In this case, the image feature 2 and the updated object feature 1 are fused to obtain an updated object feature 2 (a dog wearing clothes and a hat). The same applies to subsequent video frames.

In an optional implementation of some embodiments, after the updated polar coordinates of the central position of the target object in the tracking plane image of the next video frame in the spherical polar coordinate system are determined, the method further includes:

filtering the updated polar coordinates to obtain filtered updated polar coordinates; and using the filtered updated polar coordinates as center polar coordinates of the tracking plane image of the next video frame.

In actual implementation, after the updated polar coordinates are obtained, the updated polar coordinates may be input into a filter for filtering. It is worthwhile to note that, during play, each video frame is played in real time, and polar coordinates of a subsequent video frame cannot be learned; therefore, updated polar coordinates are directly filtered once being determined.

Step 510: Use the updated polar coordinates as the reference polar coordinates to re-perform the operation step of step 506 until a tracking stop condition is reached and a reference polar coordinate sequence corresponding to the current video frame to a target video frame is obtained, where the target video frame is a corresponding video frame when the tracking stop condition is reached.

Specifically, in addition to determining the updated polar coordinates of the central position of the target object in the tracking plane image of the next video frame in the spherical polar coordinate system based on the object feature of the target object, the updated polar coordinates are further used as the reference polar coordinates to re-perform the operation step of step 506 until the tracking stop condition is reached and the reference polar coordinate sequence corresponding to the current video frame to the target video frame is obtained. The target video frame is a corresponding video frame when the tracking stop condition is reached.

The tracking stop condition is a condition indicating that the target tracking fails. When the tracking stop condition is reached, the target tracking fails, and the target object may no longer exist in a current tracking plane image. Therefore, the tracking is stopped, and a series of reference polar coordinates (namely, the reference polar coordinate sequence) obtained are output. The series of reference polar coordinates are angle-of-view centers of tracking plane images of the current video frame to the target video frame. In other words, the series of reference polar coordinates may be subsequently used as the centers of the tracking plane images to play the plane images of the current video frame to the target video frame.

It is worthwhile to note that, after the updated polar coordinates are determined, a next video frame may be further processed. According to the operation step of step 106, a tracking plane image of the next video frame is generated, and updated polar coordinates are determined, and are used as the reference polar coordinates. Then a next video frame is further processed. The same applies to subsequent video frames until the tracking stop condition is reached and a continuous reference polar coordinate sequence corresponding to the video is obtained. The continuous reference polar coordinate sequence may be used as a reference for subsequently playing the video.

In an optional implementation of some embodiments, the tracking stop condition may be specifically reached as follows:

when the confidence of the existence of the target object in the corresponding recognition region is less than a first confidence threshold or the confidence indicating how likely the next video frame belongs to the current shot is less than a second confidence threshold, determining that the tracking stop condition is reached.

Specifically, the first confidence threshold and the second confidence threshold are preset values. The first confidence threshold is used to determine whether the confidence of the existence of the target object in the corresponding recognition region is too low, in other words, determine whether the target object still exists in the corresponding recognition region. For example, the first confidence threshold may be 50 or 60. The second confidence threshold is used to determine whether a shot of a currently generated tracking plane image is still a current shot (a shot corresponding to a video frame in which the user box-selects the target object), in other words, determine whether the shot changes. For example, the second confidence threshold may be 30 or 40.

It is worthwhile to note that image recognition may be performed on the tracking plane image of the next video frame to obtain a corresponding image feature, and the image feature and the object feature are analyzed to obtain a confidence of the existence of the target object in the corresponding recognition region. If the confidence is greater than the first confidence threshold, the target object still exists in the corresponding recognition region, the target tracking is normal, and a next frame may continue to be tracked. If the confidence is less than the first confidence threshold, the target object does not exist in the corresponding recognition region, the target tracking fails, the tracking stop condition is reached, and the tracking is no longer performed.

In addition, if the confidence indicating how likely the next video frame belongs to the current shot is less than the second confidence threshold, it is very likely that a shot in the next video frame changes. In this case, it may be determined that the target object disappears, in other words, the target object fails to be tracked, and the tracking stop condition is reached. In other words, provided that the confidence between the image feature and the object feature is less than the first confidence threshold or the confidence indicating how likely the next video frame belongs to the current shot is less than the second confidence threshold or both, the target object fails to be tracked. In this case, it may be determined that the tracking stop condition is reached. As such, it may be determined whether the target object is successfully tracked by using the confidence between the image feature and the object feature or the confidence indicating how likely the next video frame belongs to the current shot. When the target object cannot be tracked, a continuous video including the target object is cut off, and reference polar coordinates (namely, a play image angle-of-view center) determined in the video may be output.

According to the panoramic video data processing method provided in this application, when the box-selection operation for the target object in the current video frame is received, the initial polar coordinates of the central position of the target object in the spherical polar coordinate system are determined. The object feature corresponding to the target object at the central position is determined based on the initial polar coordinates and the reference polar coordinates of the central position of the play plane image of the current video frame. The tracking plane image of the next video frame is generated by using the reference polar coordinates as the center based on the panoramic image of the next video frame in the spherical polar coordinate system. The updated polar coordinates of the central position of the target object in the tracking plane image of the next video frame in the spherical polar coordinate system are determined based on the object feature of the target object. The updated polar coordinates are used as the reference polar coordinates to re-perform the operation step of generating the tracking plane image of the next video frame by using the reference polar coordinates as the center based on the panoramic image of the next video frame in the spherical polar coordinate system, until the tracking stop condition is reached and the reference polar coordinate sequence corresponding to the current video frame to the target video frame is obtained. The target video frame is a corresponding video frame when the tracking stop condition is reached.

In this case, after the user box-selects the target object in the current video frame, the initial polar coordinates of the central position of the target object in the spherical polar coordinate system may be determined. Then the target object is moved to the central position of the play plane image, the object feature of the target object at the central position is determined for subsequent target tracking, and the reference polar coordinates of the central position of the play plane image are used as the center for generating the tracking plane image of the next video frame, so that target tracking is always performed by using the target object as a center, and a corresponding panoramic video is played. In other words, provided that the user box-selects the target object at any position, a tracking plane image centered on the target object can be automatically generated, and continuous tracking plane image angle-of-view centers can be automatically generated for the target object, without requiring the user to constantly drag the panoramic video, so that processing efficiency of the panoramic video is greatly improved, and viewing experience of the panoramic video is improved. In addition, the box-selected target object in the panoramic video is tracked based on the spherical polar coordinate system, which can effectively avoid a tracking failure caused by image distortion of the target object at different positions in the panoramic video, thereby increasing accuracy and a success rate of tracking the target object and improving a processing effect and a play effect of the panoramic video.

Figure 6:
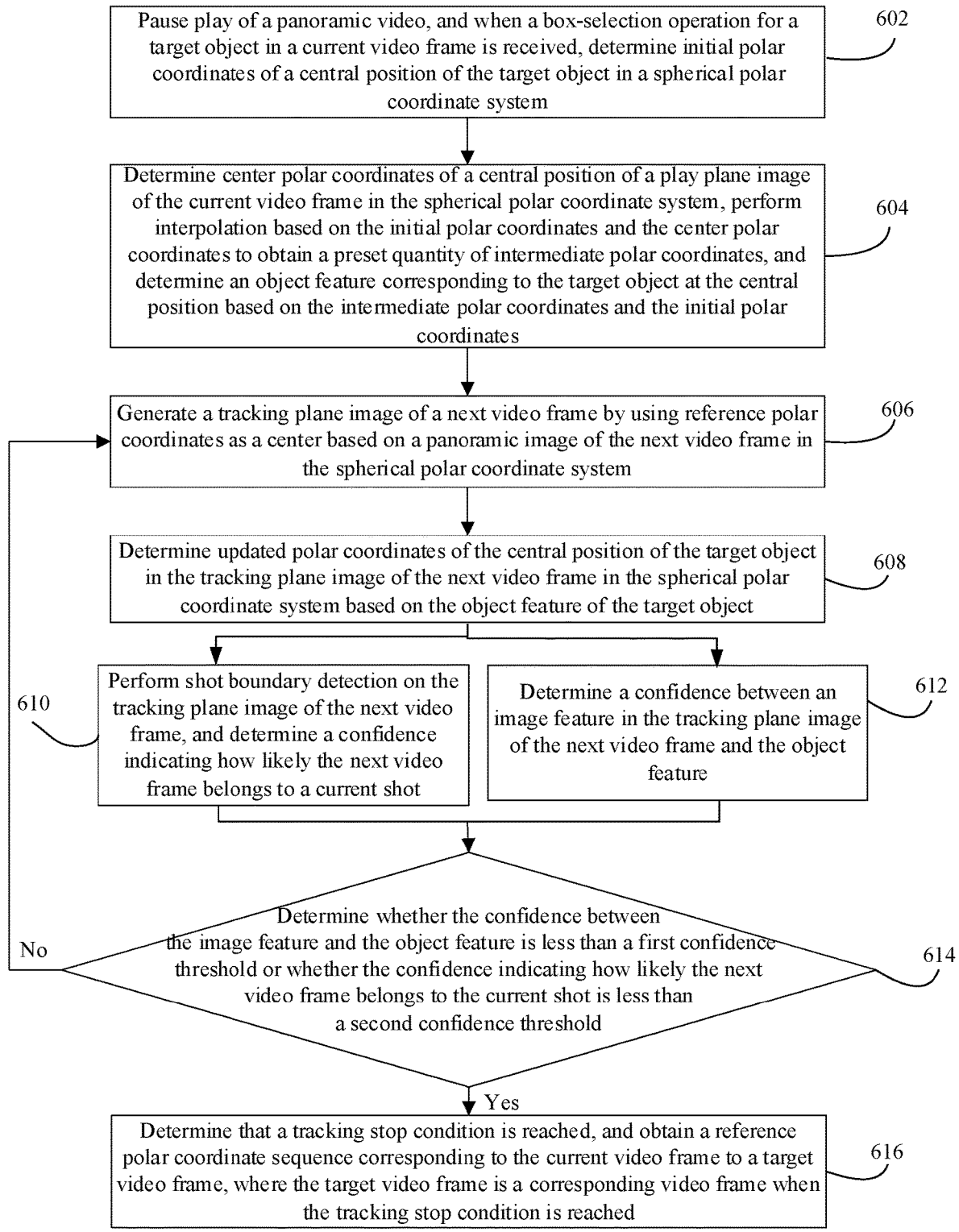
FIG. 6 is a flowchart illustrating a panoramic video data processing method according to some embodiments of this application.

FIG. 6 is a flowchart illustrating another panoramic video data processing method according to some embodiments of this application. The method includes the following steps:

Step 602: Pause play of a panoramic video, and when a box-selection operation for a target object in a current video frame is received, determine initial polar coordinates of a central position of the target object in a spherical polar coordinate system.

Step 604: Determine center polar coordinates of a central position of a play plane image of the current video frame in the spherical polar coordinate system, perform interpolation based on the initial polar coordinates and the center polar coordinates to obtain a preset quantity of intermediate polar coordinates, and determine an object feature corresponding to the target object at the central position based on the intermediate polar coordinates and the initial polar coordinates.

Step 606: Generate a tracking plane image of a next video frame by using reference polar coordinates as a center based on a panoramic image of the next video frame in the spherical polar coordinate system.

Step 608: Determine updated polar coordinates of the central position of the target object in the tracking plane image of the next video frame in the spherical polar coordinate system based on the object feature of the target object Step 610: Perform shot boundary detection on the tracking plane image of the next video frame, and determine a confidence indicating how likely the next video frame belongs to a current shot.

Step 612: Determine a confidence between an image feature in the tracking plane image of the next video frame and the object feature.

Step 614: Determine whether the confidence between the image feature and the object feature is less than a first confidence threshold or whether the confidence indicating how likely the next video frame belongs to the current shot is less than a second confidence threshold; and if yes, perform step 616, or if no, re-perform step 606.

Step 616: Determine that a tracking stop condition is reached, and obtain a reference polar coordinate sequence corresponding to the current video frame to a target video frame, where the target video frame is a corresponding video frame when the tracking stop condition is reached.

According to the panoramic video data processing method provided in this application, after a user box-selects the target object in the current video frame, the initial polar coordinates of the central position of the target object in the spherical polar coordinate system may be determined. Then the target object is moved to the central position of the play plane image, the object feature of the target object at the central position is determined for subsequent target tracking, and the reference polar coordinates of the central position of the play plane image are used as the center for generating the tracking plane image of the next video frame, so that target tracking is always performed by using the target object as a center, and a corresponding panoramic video is played. In other words, provided that the user box-selects the target object at any position, a tracking plane image centered on the target object can be automatically generated, and continuous tracking plane image angle-of-view centers can be automatically generated for the target object, without requiring the user to constantly drag the panoramic video, so that processing efficiency of the panoramic video is greatly improved, and viewing experience of the panoramic video is improved. In addition, the box-selected target object in the panoramic video is tracked based on the spherical polar coordinate system, which can effectively avoid a tracking failure caused by image distortion of the target object at different positions in the panoramic video, thereby increasing accuracy and a success rate of tracking the target object and improving a processing effect and a play effect of the panoramic video.

The foregoing describes a schematic solution of a panoramic video data processing method in the embodiments. It is worthwhile to note that the technical solution of the panoramic video data processing method shown in FIG. 6 and the technical solution of the panoramic video data processing method shown in FIG. 5 belong to the same concept. For details not described in the technical solution of the panoramic video data processing method shown in FIG. 6, references can be made to the descriptions of the technical solution of the panoramic video data processing method shown in FIG. 5.

The foregoing is merely illustrative and various modifications can be made to the described embodiments. The foregoing embodiments may be implemented individually or in any combination.

It should be noted that although technical features, characteristics, elements are described along with the one or more specific embodiments, those skilled in the art can apply them, either alone or in combination, to all of the embodiments described in the present application.

In the present disclosure, a panoramic video data processing method is also provided to improve the tracking effect for the target object.

Figure 7:
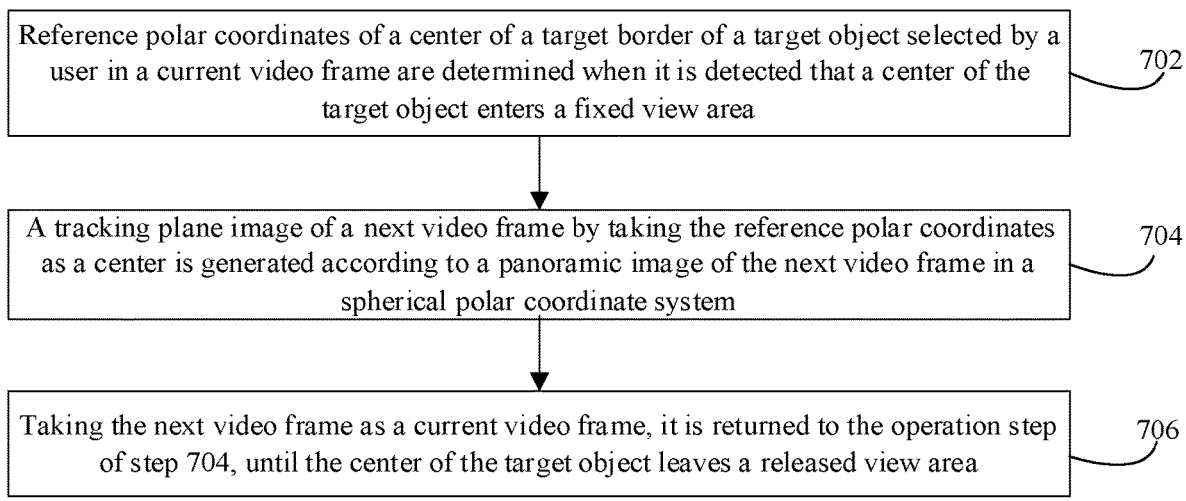
FIG. 7 is a flowchart illustrating a panoramic video data processing method according to some embodiments of this application.

FIG. 7 shows a flowchart of a panoramic video data processing method according to some embodiments of the present disclosure. The panoramic video data processing method includes the following steps.

At Step 702, reference polar coordinates of a center of a target border of a target object selected by a user in a current video frame are determined when it is detected that a center of the target object enters a fixed view area.

In practical application, at present, when tracking the target object in panoramic video, the panoramic video is often directly decoded into a frame sequence image, and then the target object is recognized and tracked frame by frame on the decoded original panoramic image. However, when the target object passes directly under or above the polar coordinate system at a large angle, that is, when the target object moves at a large angle (for example, from azimuth=90, elevation=−89.9 to azimuth=−90, elevation=−89.9), the current plane image will instantaneously have the effect of nearly vertical turnover or large angle deflection, which may lead to the inability to track the target object, thus the tracking effect is poor.

That is to say, when the target object is located at a position with a large elevation in the spherical coordinate system, if it moves a small distance to the left or right, polar coordinates of the position will change greatly, but the actual distance of movement of the target object is very small. In one possible implementation, when the target object is near the bottom of the polar coordinate system (near the South Pole), as long as it moves a little left and right, its corresponding azimuth will change greatly. For example, if the target object is at a position with an azimuth of −85 degrees, if it moves 10 degrees to the right, its corresponding azimuth will change to 85 degrees, whereas the distance result from the 10 degrees of movement at the position is significant smaller than a distance result from a 10 degrees of movement at the center portion (where the elevation=0) of the spherical coordinate system.

Figure 8:
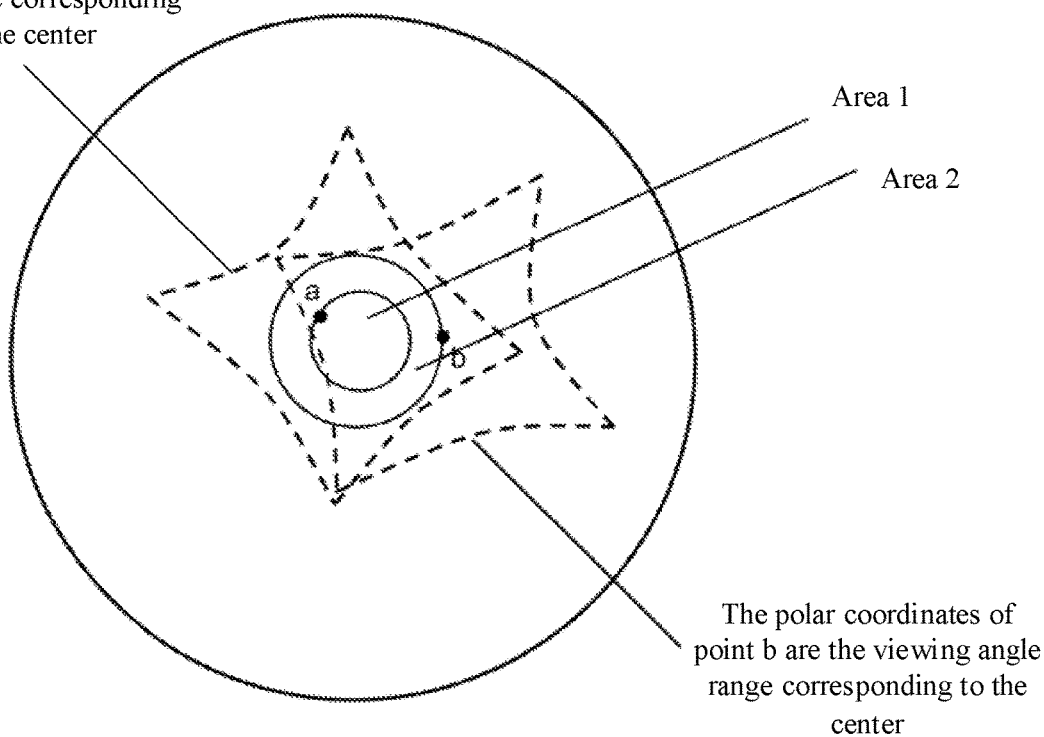
FIG. 8 is a top view of a sphere corresponding to a spherical polar coordinate system provided according to some embodiments of the present disclosure.

For example, FIG. 8 is a top view of a sphere corresponding to a spherical coordinate system according to some embodiments of the present disclosure. As shown in FIG. 7, the target object passes through the bottom of the spherical coordinate system corresponding to the panoramic video at a large angle. The area 1 is the azimuth-85 degree area, and the area 2 is the azimuth −80 degree area. When the target object passes through the bottom at a large angle, the center of the target object moves from point a to point b.

Therefore, in the present disclosure, in order to improve the tracking effect of the target object, a panoramic video data processing method is provided: reference polar coordinates of a target border of a target object selected by a user in a current video frame are determined when it is detected that a center of the target object enters a fixed view area; a tracking plane image of a next video frame is generated by taking the reference polar coordinates as a center according to a panoramic image of the next video frame in a spherical polar coordinate system; and taking the next video frame as a current video frame, it is returned to the operation step of generating a tracking plane image of a next video frame by taking the reference polar coordinates as a center according to a panoramic image of the next video frame in a spherical polar coordinate system, until the center of the target object leaves a released view area. In this case, after the center of the target object enters the fixed view area, the fixed reference polar coordinates are taken as the center to generate the plane image corresponding to the subsequent video frame, that is to say, as long as the target object does not leave the released view area, the corresponding plane image is always generated with the same polar coordinates as the center, thus effectively eliminating the large deflection of the plane image when the target object moves at a large angle, thus ensuring the tracking effect of the target object.

According to some embodiments, the target object refers to the object that the user wants to display in the center of the plane image later, and the content selected by the box-selecting operation is the target object; the target border refers to the border box-selecting the target object; the current video frame refers to the panoramic video frame when it is detected that the center of the target object enters the fixed view area, that is, the current video frame is the video frame of the fixed view area. In addition, the fixed view area is a preset area range. If the target object enters the fixed view area, the reference polar coordinates of the target border of the target object selected by a user in the current video frame may be fixed as the center of the plane image of the subsequent video frame, that is, the corresponding plane images are generated with the reference polar coordinates as the center.

In addition, the spherical coordinate system, also known as the spatial polar coordinate system, is a kind of three-dimensional coordinate system, which is extended from the two-dimensional polar coordinate system and used to determine the positions of points, lines, planes and bodies in three-dimensional space. It takes the coordinates origin as the reference point and consists of azimuth, elevation and radius distance. In the present disclosure, the radius distance in the spherical coordinate system is set as the default value in advance, generally between 100 and 300, such as 128. That is, the spherical coordinate system in the present disclosure is a spherical polar coordinate system with a fixed radius of the sphere, so the reference polar coordinates in the reference polar coordinate system in the present disclosure includes an azimuth and an elevation, and a point on the sphere (that is, the point corresponding to the central position of the target object on the sphere) may be uniquely determined through the azimuth and the elevation.

In practical application, for the plane image of each video frame, the position of coordinates of the center of the target object in the video frame may be determined by image recognition, and then it is judged whether the position of coordinates is located in the fixed view area; if so, it is determined that the center of the target object enters the fixed view area, and the video frame is determined as the current video frame.

According to some embodiments, before the determining reference polar coordinates of a target border of a target object selected by a user in a current video frame when it is detected that a center of the target object enters a fixed view area, the method further includes:

setting the fixed view area and the released view area in advance, where the fixed view area being included in the released view area.

According to some embodiments, in the sphere coordinate system, the area larger than the positive first threshold and smaller than the negative first threshold may be determined as the released view area, and the area larger than the positive second threshold and smaller than the negative second threshold may be determined as the released view area, where the first threshold is larger than the second threshold, that is, the released view area should be included in the released view area, that is, the released view area should be larger than the size of the fixed view area.

It should be noted that when the target object passes vertically above or below the spherical coordinate system, the azimuth of the center of the plane image may change greatly instantaneously, and because of the deviation of the algorithm, when the center of the target object changes back and forth around the elevation of 90 degrees, the azimuth may also change continuously, resulting in poor tracking effect of the target object. Therefore, in the present disclosure, the fixed view area is set to avoid frequently calculating the change of the reference polar coordinates corresponding to large angles, and the reference polar coordinates of the target border may only be calculated once when the target object enters the fixed view area. In addition, the released view area is set to prevent the target object from constantly moving near the boundary of the fixed view area, so the reference polar coordinates corresponding to large angles may be calculated many times, so the fixed view area and the released view area are different in the present disclosure.

For example, the fixed view area may be an area greater than 85 degrees and less than −85 degrees, and the released view area may be an area greater than 80 degrees and less than −80 degrees.

At Step 704, a tracking plane image of a next video frame by taking the reference polar coordinates as a center is generated according to a panoramic image of the next video frame in a spherical polar coordinate system.

According to some embodiments, on the basis of determining reference polar coordinates of a target border of a target object selected by a user in a current video frame when it is detected that a center of the target object enters a fixed view area, further, according to the panoramic image of the next video frame in the spherical coordinate system, the plane image of the next video frame will be generated with the reference polar coordinates as the center. The tracking plane image is the plane image used by the pointer to track the target object.

It should be noted that the reference polar coordinates of the target border of the target object selected by a user in the current video frame may be taken as the polar coordinates used for searching the target object in the next video frame. That is, according to the reference polar coordinates of the target border of the target object selected by a user in the current video frame, the tracking plane image of the next video frame is generated, and after the tracking plane image of the next video frame is generated, the target object may be searched in the tracking plane image, so as to determine whether the center of the target object leaves the released view area.

According to some embodiments, a tracking plane image of a next video frame is generated by taking the reference polar coordinates as a center according to a panoramic image of the next video frame in a spherical polar coordinate system, and the implementation process may be as follows:

mapping the next video frame to the spherical polar coordinate system to obtain the panoramic image of the next video frame in the spherical polar coordinate system;

capturing the panoramic image by taking the reference polar coordinates as the center and a preset angle as the range; and converting the captured panoramic image into the tracking plane image of the next video frame.

According to some embodiments, the preset angle range refers to the preset range of elevation and azimuth. For example, an elevation is 30 degrees and an azimuth is 45 degrees. It should be noted that when generating the tracking plane image corresponding to each video frame of panoramic video, the preset angle range is the same, that is to say, a range of elevation and azimuth is preset first as the field of view, the tracking plane image of the first frame of panoramic video is generated with the range of elevation and azimuth, and the tracking plane image of each subsequent frame of panoramic video is generated with the range of elevation and azimuth.

In the present disclosure, the panoramic image of the next video frame may be projected into the spherical coordinate system, and then a certain panoramic image may be intercepted and mapped into a two-dimensional plane image by taking the determined reference polar coordinates as the center, so that the tracking plane image of the next video frame may be obtained. Since the tracking plane image is intercepted and generated by taking the reference polar coordinates of the central position of the target object of the previous video frame (the next video frame is regarded as the current video frame) as the center, the target object in the next video frame is still near the central position of the tracking plane image.

According to some embodiments, after the generating a tracking plane image of a next video frame by taking the reference polar coordinates as a center according to a panoramic image of the next video frame in a spherical polar coordinate system, the method further includes:

determining the updated polar coordinates of the central position of the target border in the spherical polar coordinate system in the tracking plane image of the next video frame according to the object feature in the target border; and playing the plane image of the next video frame by using the updated polar coordinates.

It should be noted that the object feature of the target object (that is, the object feature in the target border) located at the center of the current playing plane image may be obtained by image recognition of the playing plane image of the current video frame. Based on the object feature, the target tracking may be performed in the generated tracking plane image of the next video frame to find the corresponding target object, and then the reference polar coordinates are updated based on the newly determined target object, and then the plane image of the next video frame is played with the updated polar coordinates. The playing plane image refers to the plane image actually played by the client, that is, the plane image that the user can see.

That is to say, the fixed view area is only fixing the polar coordinates for searching the target object, that is, the polar coordinates (reference polar coordinates) for searching the target object only need to ensure that the target object is in the fixed view area, but not necessarily in the center of the playing plane image. However, when actually playing the panoramic video, the target object still needs to be fixed at the center of the playing plane image for playing, that is, according to the object feature in the target border, the updated polar coordinates of the central position of the target border in the tracking plane image of the next video frame need to be determined, and the panoramic video is played with the updated polar coordinates.

According to some embodiments, the updated polar coordinates of the central position of the target object in the spherical polar coordinate system in the tracking plane image of the next video frame according to the object feature of the target object are determined, and the implementation process may be as follows:

performing image recognition on the recognition area in the tracking plane image of the next video frame to determine the central position of the target object in the next video frame; and determining the updated polar coordinates of the central position of the target object in the next video frame in the spherical polar coordinate system.

It should be noted that the corresponding image feature may be obtained by image recognition of the tracking plane image of the next video frame, and then the image feature with the object feature of the target object is determined as the target object, and then the updated polar coordinates of the updated central position of the target object may be determined.

In addition, when performing image recognition on the tracking plane image of the next video frame to recognize the corresponding image feature, image recognition may be performed on the whole tracking plane image to recognize the corresponding image feature. In addition, only the area near the target border of the target object selected by a user may be recognized, that is, the recognition area in the tracking plane image of the next video frame may be determined first, and then only the image recognition may be performed in this recognition area. According to some embodiments, part of the image content larger than or equal to the target border may be selected as the recognition area, so that the image recognition speed of the whole playing plane image is improved, and the processing efficiency of the whole panoramic video is improved.

For example, the area of the box-selected by the target border corresponding to the box-selecting operation may be determined first, and then the area of the preset multiple is determined as the recognition area, and image recognition is performed only in the recognition area.

According to some embodiments, image recognition is performed on the recognition area in the tracking plane image of the next video frame to determine the central position of the target object in the next video frame, and the implementation process may be as follows:

performing image recognition on the recognition area in the tracking plane image of the next video frame to obtain an image feature;

analyzing and processing the image feature and the object feature to obtain the confidence of the existence of the target object in the recognition area, and the position offset of the image feature relative to the central position of the recognition area; and determining the central position of the target object in the next video frame according to the central position of the target object in the playing plane image and the position offset when the confidence is greater than the confidence threshold.

According to some embodiments, the confidence is also called reliability, or confidence level or confidence coefficient, and the confidence of the existence of the target object in the recognition area may indicate whether the target object exists in the recognition area. It should be noted that after image recognition is performed on the recognition area in the tracking plane image of the next video frame and image feature are obtained, it is necessary to determine whether the recognized image feature is the initial box-selected target object, so that the image feature and the object feature may be analyzed and processed to determine the confidence of the existence of the target object in the recognition area, that is, the reliability that the target object exists in the recognition area. According to some embodiments, different algorithms may be used to analyze and process the image feature and the object feature to obtain the confidence of the existence of the target object in the recognition area.

In a possible implementation, the similarity between the image feature and the object feature may be determined by feature comparison, so as to obtain the confidence of the existence of the target object in the recognition area. According to some embodiments, the image feature and the object feature may be compared to determine the similarity between the image feature and the object feature, and the similarity may be determined as the confidence of the existence of the target object in the recognition area.

In addition, the confidence of the existence of the target object in the recognition area may be obtained by convolving the image feature and the object feature. Of course, in practical application, other tracking algorithms may be used to input the image feature and the object feature into the tracking algorithm to obtain the confidence of the existence of the target object in the recognition area, which is not limited in the present disclosure.

It should be noted that when analyzing and processing the image feature and the object feature, in addition to obtaining the confidence of the existence of the target object in the recognition area, the position offset of the image feature relative to the central position of the recognition area may also be obtained. Since the recognition area is determined according to the target object in the playing plane image of the current video frame, the central position of the recognition area may actually indicate the central position of the target object in the current video frame. In addition, the image feature is the feature obtained by recognizing the recognition area in the next video frame, while the object feature is the object feature of the target object in the current video frame (that is, the feature when the target object is located at the central position of the image). By analyzing and comparing the image feature and the object feature, we may get the change of the image feature in the next video frame relative to the feature when the target object is located at the central position of the image, which may indicate the position offset of the image feature relative to the central position of the recognition area.

In addition, because the image feature is the feature obtained by image recognition of the recognition area in the tracking plane image of the next video frame, the image feature is the feature corresponding to the candidate target object, then the position offset of the image feature relative to the central position of the recognition area is the position offset of the candidate target object relative to the central position of the recognition area, and when it is subsequently determined that the candidate target object is the target object in the current video frame, the position offset may indicate how far the target object has moved relative to the current video frame in the next video frame.

When the confidence is greater than the confidence threshold, it indicates that the recognized image feature is likely to be the initial box-selected target object. Therefore, so at this time, the updated central position of the target object (that is, the central position of the target object in the next video frame) may be obtained according to the initial central position (the central position of the target object in the playing plane image) and the position offset (that is, the moving distance of the target object).

It should be noted that target tracking is performed in the new video frame (that is, the next video frame), the position of the target object in the next video frame is determined, and then the updated polar coordinates of the central position of the target object are further determined, so as to continuously generate the tracking plane images of the subsequent video frame and track the target object.

At Step 706, taking the next video frame as a current video frame, it is returned to the operation step of step 704, until the center of the target object leaves a released view area.

According to some embodiments, on the basis of generating a tracking plane image of a next video frame by taking the reference polar coordinates as a center according to a panoramic image of the next video frame in a spherical polar coordinate system, further, taking the next video frame as a current video frame, it is returned to the operation step of generating a tracking plane image of a next video frame by taking the reference polar coordinates as a center according to a panoramic image of the next video frame in a spherical polar coordinate system, until the center of the target border leaves a released view area.

In practical application, if the target object leaves the released view area, it means that the target may have been far away from the central position of the tracking plane image obtained by fixed polar coordinates. At this time, the fixed reference polar coordinates may no longer be taken as the central position of the tracking plane image, and other tracking methods are needed. According to some embodiments, image recognition may be performed on the tracking plane image of the next video frame to obtain the object feature of the target object. According to the object feature, it is determined whether the target object leaves the released view area.

It should be noted that after the target object enters the fixed view area, the viewing angle may be fixed by using the reference polar coordinates of the target border of the target object selected by a user in the current video, and then the corresponding tracking plane images are generated around the reference polar coordinates until the target object leaves the released view area.

For example, as shown in FIG. 8, the center of the target object moves from point a to point b, and the viewing angle is fixed at point a. The fixed viewing angle will not be released until it moves to point b. The viewing angle range when polar coordinates of point a are taken as the center and the viewing angle range when polar coordinates of point b are taken as the center are shown in FIG. 8.

In addition, after the target object leaves the released view area, target tracking may be performed in subsequent video frame through the vertex positions of the target border, and target tracking may also be performed in subsequent video frame by means of interpolation. By tracking the target in the subsequent video frame through the vertex position of the target border, since the rectangle box-selected in one plane image is not exactly the same rectangle in another plane image, no matter how the coordinates mapping is performed, the content in the new rectangular border will definitely be different from that in the previous plane image, so by using this method, the rectangular border in feature extraction may not just fit the target object, and the tracking effect of the target object may be reduced. However, the interpolation is used to track the target in the subsequent video frame, instead of processing the border according to the corresponding coordinates transformation or mapping, the tracking algorithm itself is used to track the border suitable for the target in the new plane image while the viewing angle changes according to the semantic information of the image, so the position of the rectangular border will be more suitable for the target at last, but the calculation amount of interpolation will be relatively large. Therefore, when the calculation amount is mainly considered, the target tracking may be performed in the subsequent video frame by the vertex position of the target border, while when the tracking effect of the target object is mainly considered, the interpolation may be selected to track the target in the subsequent video frame.

According to some embodiments, the method further includes:

determining an updated target border in a plane image corresponding to the target object in the current video frame leaving the released view area according to a vertex position of the target border in a plane image corresponding to a fixed viewing angle of the current video frame when it is detected that the center of the target object leaves the released view area;

performing image recognition on the plane image corresponding to the target object in the current video frame leaving the released view area to determine an object feature in the updated target border; and determining updated central polar coordinates of the target border in a tracking plane image of a next video frame according to the object feature in the updated target border.

It should be noted that polar coordinates of the viewing angle is fixed when entering the fixed view area, and when it is detected that the center of the target object leaves the released view area, a plane image corresponding to the fixed viewing angle may first be generated according to the current video frame. The target border in the plane image is the same as the target border in the fixed view area, and a plane image corresponding to leaves the released view area may also be generated. Then, based on the vertex position of the target border in the plane image corresponding to the fixed viewing angle, the updated target border is determined, the vertex position includes the polar coordinates of the four vertices. Then, the polar coordinates of the four vertices may be mapped to the plane image corresponding to leaving the released view area, so as to continue the subsequent target tracking.

According to some embodiments, an updated target border in a plane image corresponding to the target object in the current video frame leaving the released view area according to a vertex position of the target border in a plane image is determined corresponding to a fixed viewing angle of the current video frame, and the implementation process may be as follows:

determining vertex coordinates of the target border in the plane image corresponding to the fixed viewing angle of the current video frame;

determining updated vertex coordinates in the plane image corresponding to the target object in the current video frame leaving the released view area according to the vertex coordinates of the target border;

determining a maximum value and a minimum value of abscissa and a maximum value and a minimum value of ordinate in the updated vertex coordinates; and determining the updated target border in the plane image corresponding to the target object in the current video frame leaving the released view area according to the maximum value and the minimum value of the abscissa and the maximum value and the minimum value of the ordinate.

In practical application, after determining vertex coordinates of the target border in the plane image corresponding to the fixed viewing angle of the current video frame, the vertex coordinates of the target border may be mapped to the spherical coordinate system, and the updated vertex coordinates in the plane image corresponding to the target object leaving the released view area in the current video frame may be determined according to the vertices mapped to the spherical coordinate system and the picture of the target object leaving the released view area in the spherical coordinate system.

It should be noted that after mapping the vertex coordinates of the target border in the plane image corresponding to the fixed viewing angle of the current video frame to the plane image corresponding to the target object leaving the released view area in the current video frame, the updated vertex coordinates may be obtained. At this time, the vertices corresponding to the four vertex coordinates no longer keep a rectangular shape, so the maximum and minimum values of the abscissa and ordinate in the four updated vertex coordinates may be calculated, and the minimum and maximum values may be connected by straight lines to form a new target border, that is, to update the target border. Subsequently, the object feature in the updated target border may be extracted again, and subsequent tracking calculation may be continued.

According to some embodiments, the method further includes:

determining polar coordinates of the center of the target border as initial polar coordinates, and determining central polar coordinates of the central position of a playing plane image of the current video frame when it is detected that the center of the target object leaves the released view area;

performing interpolation according to the initial polar coordinates and the central polar coordinates to obtain a preset number of intermediate polar coordinates;

determining the object feature corresponding to the target border in the central position according to the intermediate polar coordinates and the initial polar coordinates; and determining the updated central polar coordinates of the target border in the tracking plane image of the next video frame according to the object feature.

It should be noted that if the target object is far away from the central position of the playing plane image when it leaves the released view area, directly moving the target object to the corresponding position when it leaves the released view area may lead to distortion of the target object, so it is necessary to slowly move the target object from the position in the released view area to the position when it leaves the released view area by interpolation, and then determine the object feature of the target object at the central position.

According to some embodiments, the object feature corresponding to the target object in the central position is determined according to the intermediate polar coordinates and the initial polar coordinates, and the implementation process may be as follows:

arranging the intermediate polar coordinates and the initial polar coordinates in sequence to obtain a polar coordinate set;

performing image recognition on the playing plane image of the current video frame to determine the object feature of the target object;

generating the tracking plane image of the current video frame by taking the i-th polar coordinates in the polar coordinate set as the center according to the panoramic image of the current video frame in the spherical polar coordinate system, where i is equal to 1; and enabling i to increase by 1, taking the tracking plane image as the playing plane image, returning to the operation step of performing image recognition on the playing plane image of the current video frame to determine the object feature of the target object, until i is equal to the number of polar coordinates included in the polar coordinate set, thereby obtaining the object feature corresponding to the target border being located at the central position.

It should be noted that the intermediate polar coordinates and the initial polar coordinates are arranged in sequence to obtain a polar coordinate set, that is, all intermediate polar coordinates obtained by interpolation are arranged according to the distance from the central polar coordinates from small to large, and after the intermediate polar coordinates are arranged, the initial polar coordinates are arranged to obtain the polar coordinate set; that is to say, the first polar coordinates in the polar coordinate set are the polar coordinates with the smallest distance from the central polar coordinates, and the last polar coordinates in the polar coordinate set are the polar coordinates with the largest distance from the central polar coordinates (that is, the initial polar coordinates).

In actual implementation, it is necessary to move the center of the target border from the current initial polar coordinates to the central polar coordinates of the central position of the playing plane image, that is, the central polar coordinates are the starting point of interpolation, and the initial polar coordinates are the end point of interpolation. The interpolation is based on the initial polar coordinates and the central polar coordinates, that is, the value between the initial polar coordinates and the central polar coordinates are divided into preset number of equal parts to obtain multiple interpolated intermediate polar coordinates. Then, taking each intermediate polar coordinates obtained by interpolation as the center in sequence, corresponding plane images are generated until the last one with the initial polar coordinates as the center is obtained, and the corresponding tracking plane image is generated, that is, the plane image with the target object located at the center of the playing plane image of the current video frame. By image recognition of the tracking plane image taking the initial polar coordinates as the center, the object feature of the target object located at the central position of the playing plane image of the current video frame may be obtained. In addition, when determining the interpolation parameters, that is, when determining how many equal parts to divide the value between the initial polar coordinates and the central polar coordinates, it may be determined according to the larger one of the difference values between the two polar coordinates.

For example, assuming that the central polar coordinates are (0,0) and the initial polar coordinates are (50,80), that is, the starting value of interpolation is (0,0) and the end value is (50,80), assuming that the preset number is 20, it is necessary to divide 80-0 into 20 equal parts and 50-0 into 20 equal parts to obtain the intermediate polar coordinates ((2.5, 4), (5, 8), . . . (45, 72), (47.5, 76)). Therefore, the polar coordinate set obtained at this time is ((2.5, 4), (5, 8), . . . , (45, 72), (47.5, 76), (50,80)).

Image recognition is performed on the playing plane image of the current video frame (that is, the plane image with the polar coordinates of (0,0) at the central position of the target object) to obtain the object feature of the target object; then, according to the panoramic image of the current video frame in the spherical coordinate system, the tracking plane image of the current video frame is generated with (2.5, 4) as the center, and the tracking plane image is taken as the playing plane image for image recognition to obtain the object feature of the target object; then, taking (5, 8) as the center, the tracking plane image of the current video frame is generated, and the tracking plane image is taken as the playing plane image for image recognition to obtain the object feature of the target object. And so on, until (50,80) is taken as the center, the tracking plane image of the current video frame is generated, and image recognition is performed on the tracking plane image to obtain the object feature that the target object is located at the central position of the playing plane image of the current video frame.

According to some embodiments, image recognition is performed on the plane image corresponding to the target object in the current video frame leaving the released view area to determine the object feature in the updated target border, and the implementation process may be as follows:

determining the target border corresponding to the box-selecting operation;

determining the corresponding recognition area according to the target border; and performing image recognition in the recognition area in the plane image corresponding to the current video frame leaving the released view area to determine the object feature of the target object.

It should be noted that when the target object is selected, the target border may be used for box-selecting. Then, according to the target border, part of the image content greater than or equal to the target border may be selected as the recognition area, and then the image recognition may be performed only in this recognition area.

In practical application, the area box-selected by the target border may be determined, and the preset multiple of the area may be determined as the recognition area. Of course, the length and width of the target border may also be determined, and an area formed by the preset multiple of the length and width is determined as the recognition area. According to some embodiments, the preset multiple may be preset, and the preset multiple is used to determine the last area for final image recognition. For example, the preset multiple may be 1.5 times, 2 times, and the like.

It should be noted that, in order to track the target object for subsequent video frame, it is necessary to perform image recognition on the target object box-selected in the plane image corresponding to the current video frame leaving the released view area, to obtain the target object located at the center of the plane image (that is, to update the object feature in the target border). According to some embodiments, the tracking algorithm may be a tracking algorithm based on correlation filtering, such as KCF (Kernel Correlation Filter), DSST (Discriminatory Scale Space Tracker, a filtering algorithm combining position and scale) and the like, or a tracking algorithm based on deep learning, such as SiamRPN, SiamFC and the like. The tracking algorithm is not limited in the present disclosure.

In addition, when performing image recognition on the plane image corresponding to the current video frame leaving the released view area and extracting the object feature of the target object in the updated target border, image recognition may be performed on the whole plane image to extract feature. In addition, since only the object feature of the target object need to be acquired at last, the image recognition may only be performed on the area near the target border, that is, the area box-selected by the box-selecting operation may be determined first, and then the area with a preset multiple may be determined as the recognition area, so that the image recognition may be performed only in the recognition area, without image recognition on the whole plane image, thus improving the image recognition speed and the processing efficiency of the whole panoramic video.

According to the panoramic video data processing method provided by the present disclosure, reference polar coordinates of a target border of a target object selected by a user in a current video frame are determined when it is detected that a center of the target object enters a fixed view area; a tracking plane image of a next video frame is generated by taking the reference polar coordinates as a center according to a panoramic image of the next video frame in a spherical polar coordinate system; and taking the next video frame as a current video frame, it is returned to the operation step of generating a tracking plane image of a next video frame by taking the reference polar coordinates as a center according to a panoramic image of the next video frame in a spherical polar coordinate system, until the center of the target object leaves a released view area. When the center of the target object leaves the released view area, the target tracking may be performed in the subsequent video frame by the vertex position of the target border, or the target tracking may be performed in the subsequent video frame by interpolation.

In this case, the fixed view area and the released view area may be preset as buffer areas. After the center of the target object enters the fixed view area, the fixed reference polar coordinates are taken as the center to generate the tracking plane image corresponding to the subsequent video frame, that is, as long as the target object does not leave the released view area, the corresponding tracking plane image is always generated with the same polar coordinates as the center, thus effectively eliminating the large deflection of the tracking plane image when the target object moves at a large angle, and thus ensuring the tracking effect of the target object. In addition, when the center of the target object leaves the released view area, the target tracking may be performed in the subsequent video frame through the vertex position of the target border, or the target tracking may be performed in the subsequent video frame by interpolation, so as to ensure the tracking effect of the target object in the subsequent panoramic video.

Figure 9:
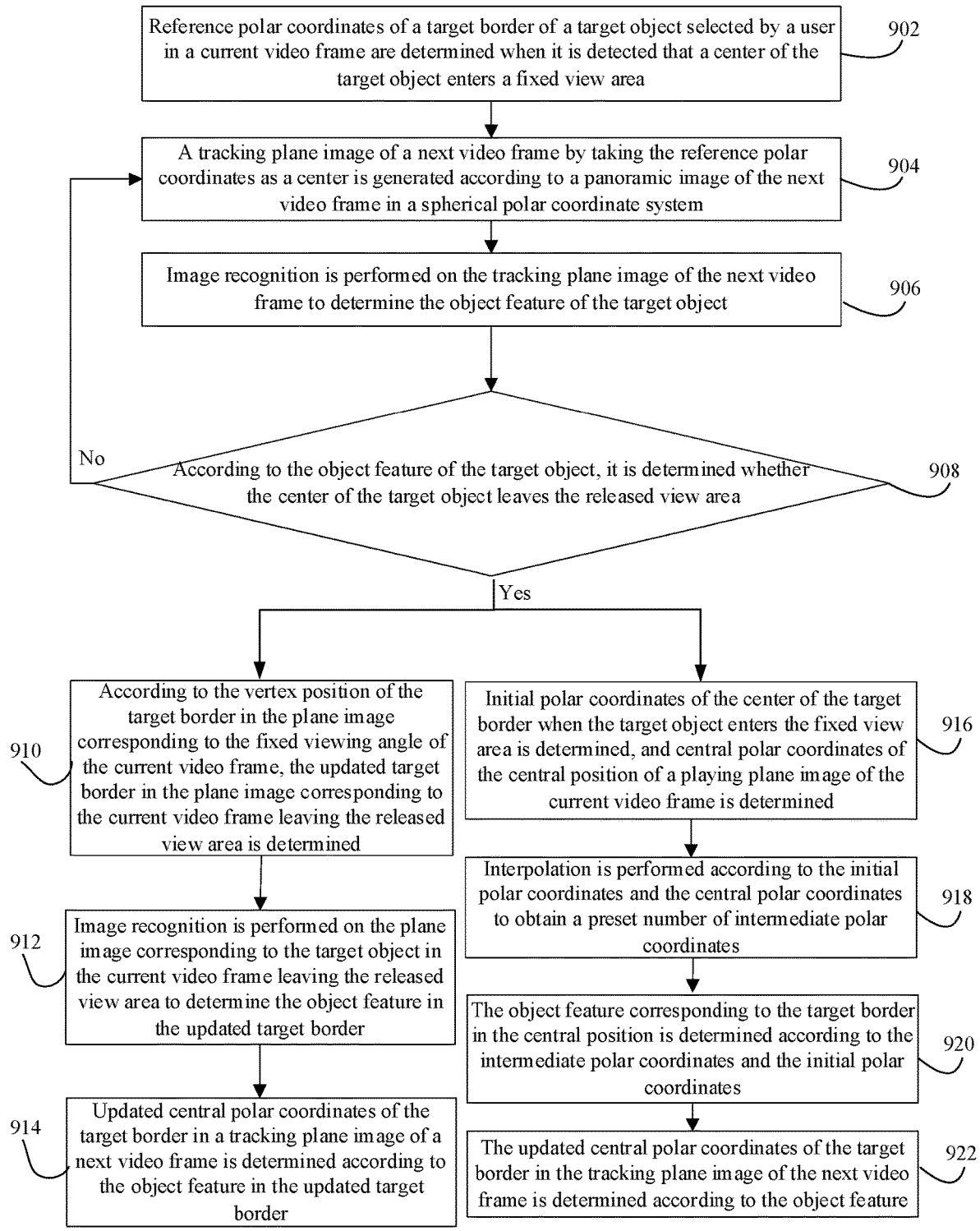
FIG. 9 is a flowchart illustrating a panoramic video data processing method according to some embodiments of this application.

FIG. 9 shows a flowchart of another panoramic video data processing method according to some embodiments of the present disclosure, which includes the following steps.

At Step 902, reference polar coordinates of a target border of a target object selected by a user in a current video frame are determined when it is detected that a center of the target object enters a fixed view area.

At Step 904, a tracking plane image of a next video frame by taking the reference polar coordinates as a center is generated according to a panoramic image of the next video frame in a spherical polar coordinate system.

At Step 906, image recognition is performed on the tracking plane image of the next video frame to determine the object feature of the target object.

At Step 908, according to the object feature of the target object, it is determined whether the center of the target object leaves the released view area; if so, the following steps 810-814 or 816-822 are executed; if not, it is returned to the above step 804.

At Step 910, according to the vertex position of the target border in the plane image corresponding to the fixed viewing angle of the current video frame, the updated target border in the plane image corresponding to the current video frame leaving the released view area is determined.

At Step 912, image recognition is performed on the plane image corresponding to the target object in the current video frame leaving the released view area to determine the object feature in the updated target border.

At Step 914, updated central polar coordinates of the target border in a tracking plane image of a next video frame is determined according to the object feature in the updated target border.

At Step 916, initial polar coordinates of the center of the target border when the target object enters the fixed view area is determined, and central polar coordinates of the central position of a playing plane image of the current video frame is determined.

At Step 918, interpolation is performed according to the initial polar coordinates and the central polar coordinates to obtain a preset number of intermediate polar coordinates.

At Step 920, the object feature corresponding to the target border in the central position is determined according to the intermediate polar coordinates and the initial polar coordinates.

At Step 922, the updated central polar coordinates of the target border in the tracking plane image of the next video frame is determined according to the object feature.

According to the panoramic video data processing method provided by the present disclosure, the fixed view area and the released view area may be preset as buffer areas. After the center of the target object enters the fixed view area, the fixed reference polar coordinates are taken as the center to generate the plane images corresponding to the subsequent video frame, that is, as long as the target object does not leave the released view area, the corresponding plane images are always generated with the same polar coordinates as the center, thus effectively eliminating the large deflection of the plane images when the target object moves at a large angle, thus ensuring the tracking of the target object. In addition, when the center of the target object leaves the released view area, the target tracking may be performed in the subsequent video frame through the vertex position of the target border, or the target tracking may be performed in the subsequent video frame by interpolation, so as to ensure the tracking effect of the target object in the subsequent panoramic video.

The foregoing describes a schematic solution of a panoramic video data processing method in the embodiments. It is worthwhile to note that the technical solution of the panoramic video data processing method shown in FIG. 9 and the technical solution of the panoramic video data processing method shown in FIG. 7 belong to the same concept. For details not described in the technical solution of the panoramic video data processing method shown in FIG. 9, references can be made to the descriptions of the technical solution of the panoramic video data processing method shown in FIG. 7.

Figure 10:
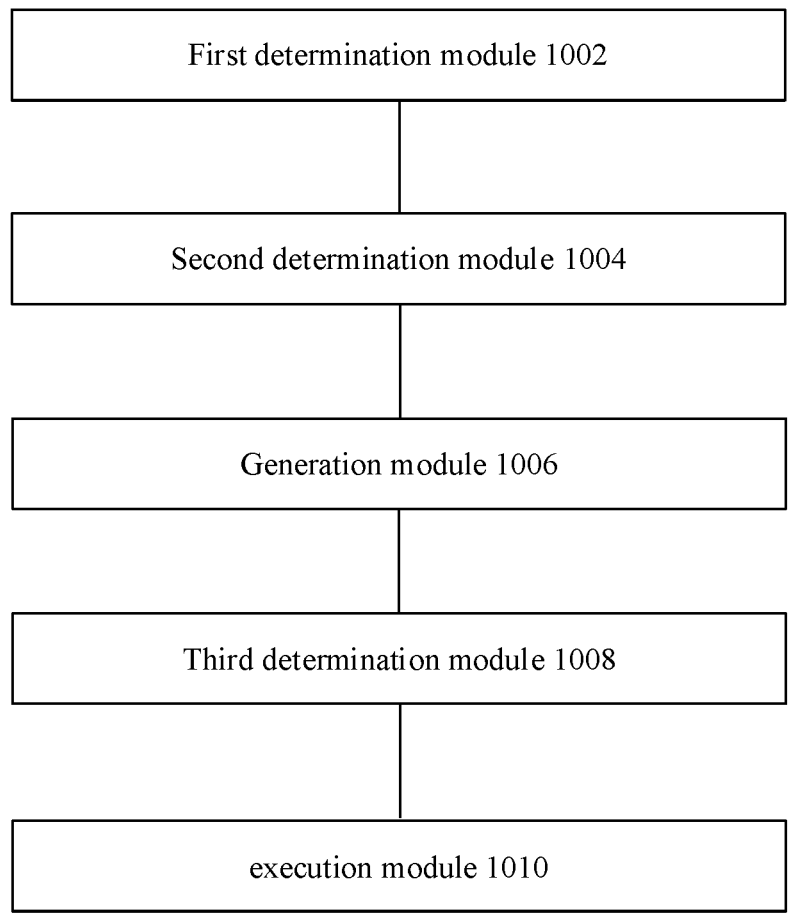
FIG. 10 is a schematic diagram illustrating a structure of a panoramic video data processing apparatus according to some embodiments of this application.

This application provides a panoramic video data processing method. This application also relates to a panoramic video data processing apparatus, a computing device, and a computer-readable storage medium. The panoramic video data processing method, the panoramic video data processing apparatus, the computing device, and the computer-readable storage medium are described in detail one by one in the following embodiments Corresponding to the method embodiments, this application further provides embodiments of a panoramic video data processing apparatus. FIG. 10 is a schematic diagram illustrating a structure of a panoramic video data processing apparatus according to some embodiments of this application. As shown in FIG. 10, the apparatus includes:

a first determining module 1002, configured to determine, in response to receiving a box-selection operation for a target object in a current video frame, reference polar coordinates of a central position of a play plane image of the current video frame in a spherical polar coordinate system;

a second determining module 1004, configured to determine an object feature corresponding to the target object;

a generation module 1006, configured to generate a tracking plane image of a next video frame by using the reference polar coordinates as a center based on a panoramic image of the next video frame in the spherical polar coordinate system;

a third determining module 1008, configured to determine updated polar coordinates of the central position of the target object in the tracking plane image of the next video frame in the spherical polar coordinate system based on the object feature of the target object; and an execution module 1010, configured to use the updated polar coordinates as the reference polar coordinates to re-perform the operation step of generating a tracking plane image of a next video frame by using the reference polar coordinates as a center based on a panoramic image of the next video frame in the spherical polar coordinate system, until a tracking stop condition is reached and a reference polar coordinate sequence corresponding to the current video frame to a target video frame is obtained, where the target video frame is a corresponding video frame when the tracking stop condition is reached.

The foregoing is merely illustrative and various modifications can be made to the described embodiments. The foregoing embodiments may be implemented individually or in any combination.

It should be noted that although technical features, characteristics, elements are described along with the one or more specific embodiments, those skilled in the art can apply them, either alone or in combination, to all of the embodiments described in the present application.

According to some embodiments, a first determining module 1002 is further configured to:

determine upon receiving a box-selection operation for a target object at a center of a playback plane image for a current video frame, reference polar coordinates of a central position of the target object in a spherical coordinate system;

determine the reference polar coordinates of a central position of the target object as the reference polar coordinates of a central position of a play plane image of the current video frame.

According to some embodiments, the apparatus further includes an update module configured to:

receive a move operation of dragging the target object to the center of the playback plane image; and update, based on the move operation, the playback plane image for the current video frame to a plane image with the target object located at a center of the plane image.

According to some embodiments, the first determination module 1002 is further configured to:

determine a central position of the target object in the playback plane image; and determine the reference polar coordinates of the central position in the spherical coordinate system based on a panoramic image of the current video frame in the spherical coordinate system and the central position.

According to some embodiments, the apparatus further includes a recognition module configured to:

perform image recognition on the playback plane image for the current video frame, to determine the object feature of the target object.

According to some embodiments, the recognition module is further configured to:

determine a target border corresponding to the marquee selection operation;

determine a corresponding recognition region based on the target border; and perform image recognition on the corresponding recognition region of the playback plane image for the current video frame.

According to some embodiments, the generation module 1006 is further configured to:

map the next video frame into the spherical coordinate system to obtain the panoramic image of the next video frame in the spherical coordinate system;

capture a range with a preset angle of the panoramic image with a center as the reference polar coordinates; and convert the captured panoramic image into the tracking plane image for the next video frame.

According to some embodiments, the second determination module 1004 is further configured to:

perform image recognition on the corresponding recognition region in the tracking plane image for the next video frame, to determine the central position of the target object in the next video frame; and determine the updated polar coordinates of the central position of the target object in the next video frame in the spherical coordinate system.

According to some embodiments, the second determination module 1004 is further configured to:

perform image recognition on the recognition region in the tracking plane image for the next video frame, to obtain an image feature;

analyze the image feature and the object feature to obtain a confidence score of the presence of the target object in the recognition region, and a position offset of the image feature relative to a central position of the recognition region; and in response to determining the confidence score is greater than a confidence score threshold, determine the central position of the target object in the next video frame based on the central position of the target object in the playback plane image and the position offset.

According to some embodiments, the second determination module 1004 is further configured to:

merge the image feature and the object feature to obtain an updated object feature.

According to some embodiments, the execution module 1008 is further configured to:

determine a similarity between the target image feature and the object feature; and in response to determining the confidence score of the presence of the target object in the recognition region is less than the confidence score threshold, determine the tracking stop condition is met.

According to some embodiments, the apparatus further includes a processing module configured to:

smooth and filter the reference polar coordinates corresponding to the sequence of frames from the current video frame to the target video frame, to obtain a sequence of smoothed and filtered reference polar coordinates; and determine the sequence of smoothed and filtered reference polar coordinates as centers of playback plane images for playing the sequence of frames from the current video frame to the target video frame.

According to the apparatus of processing panoramic video data provided in the present application, after marquee selecting the target object that is at the center of the playback plane image of the current video by the creator, the reference polar coordinates of the central position of the target object in the spherical coordinate system may be determined as a center of the tracking plane image for the next video frame to be generated, so that the corresponding panoramic video is played always with the target object located at the center of the corresponding panoramic video. In other words, once the creator marquee selects the target object, the tracking plane image with the target object located at the center can be automatically generated for target tracking. For the target object, centers of viewing angle for consecutive tracking plane images can be automatically generated, without need of processing the panoramic video frame by frame, which greatly improves efficiency of processing the panoramic video. In addition, as, for the target object that is marquee selected, the target object in the panoramic video is tracked based on the spherical coordinate system, a tracking failure that is caused by a picture distortion induced by the different positions of target object in the panoramic video, thereby the accuracy and success rate of target tracking may be improved, and panoramic video processing and playback effects may be improved.

According to some embodiments, the apparatus further includes a first determining sub-module, configured to determine, in response to receiving a box-selection operation for a target object in a current video frame, initial polar coordinates of a central position of the target object in a spherical polar coordinate system, the second determining module 404 is further configured to determine, based on the initial polar coordinates and reference polar coordinates of a central position of a play plane image of the current video frame, an object feature corresponding to the target object at the central position.

According to some embodiments, the second determining module 1004 is further configured to:

determine center polar coordinates of the central position of the play plane image of the current video frame in the spherical polar coordinate system;

perform interpolation based on the initial polar coordinates and the center polar coordinates to obtain a preset quantity of intermediate polar coordinates; and determine the object feature corresponding to the target object at the central position based on the intermediate polar coordinates and the initial polar coordinates.

According to some embodiments, the second determining module 1004 is further configured to:

sequentially arrange the intermediate polar coordinates and the initial polar coordinates to obtain a polar coordinate set;

perform image recognition on the play plane image of the current video frame to determine an object feature of the target object;

generate a tracking plane image of the current video frame by using the ith polar coordinates in the polar coordinate set as a center based on a panoramic image of the current video frame in the spherical polar coordinate system, where i is equal to 1; and increment i by 1 and use the tracking plane image as the play plane image to re-perform the operation step of performing image recognition on the play plane image of the current video frame to obtain an object feature of the target object until i is equal to a quantity of polar coordinates included in the polar coordinate set, to obtain the object feature corresponding to the target object at the central position.

According to some embodiments, the second determining module 1004 is further configured to:

determine a target box corresponding to the box-selection operation;

determine a corresponding recognition region based on the target box; and perform image recognition on the corresponding recognition region in the play plane image of the current video frame to determine the object feature of the target object.

According to some embodiments, the generation module 1006 is further configured to:

map the next video frame to the spherical polar coordinate system to obtain the panoramic image of the next video frame in the spherical polar coordinate system;

capture the panoramic image within a range of a preset angle by using the reference polar coordinates as a center; and convert the captured panoramic image into the tracking plane image of the next video frame.

According to some embodiments, the third determining module 1008 is further configured to:

perform image recognition on the corresponding recognition region in the tracking plane image of the next video frame to determine the central position of the target object in the next video frame; and determine the updated polar coordinates of the central position of the target object in the next video frame in the spherical polar coordinate system.

According to some embodiments, the third determining module 1008 is further configured to:

perform image recognition on the corresponding recognition region in the tracking plane image of the next video frame to obtain an image feature;

analyze the image feature and the object feature to obtain a confidence of the existence of the target object in the corresponding recognition region and a position offset of the image feature relative to a central position of the corresponding recognition region; and when the confidence is greater than a confidence threshold, determine the central position of the target object in the next video frame based on a central position of the target object in the play plane image and the position offset.

According to some embodiments, the third determining module 408 is further configured to:

fuse the image feature and the object feature to obtain an updated object feature.

According to some embodiments, the apparatus further includes a detection module, configured to:

perform shot boundary detection on the tracking plane image of the next video frame; and determine a confidence indicating how likely the next video frame belongs to a current shot.

According to some embodiments, the execution module 1010 is further configured to:

when the confidence of the existence of the target object in the corresponding recognition region is less than a first confidence threshold or the confidence indicating how likely the next video frame belongs to the current shot is less than a second confidence threshold, determine that the tracking stop condition is reached.

According to some embodiments, the apparatus further includes a processing module, configured to:

filter the updated polar coordinates to obtain filtered updated polar coordinates; and use the filtered updated polar coordinates as center polar coordinates of the tracking plane image of the next video frame.

According to the panoramic video data processing apparatus provided in this application, after a user box-selects the target object in the current video frame, the initial polar coordinates of the central position of the target object in the spherical polar coordinate system may be determined. Then the target object is moved to the central position of the play plane image, the object feature of the target object at the central position is determined for subsequent target tracking, and the reference polar coordinates of the central position of the play plane image are used as the center for generating the tracking plane image of the next video frame, so that target tracking is always performed by using the target object as a center, and a corresponding panoramic video is played. In other words, provided that the user box-selects the target object at any position, a tracking plane image centered on the target object can be automatically generated, and continuous tracking plane image angle-of-view centers can be automatically generated for the target object, without requiring the user to constantly drag the panoramic video, so that processing efficiency of the panoramic video is greatly improved, and viewing experience of the panoramic video is improved. In addition, the box-selected target object in the panoramic video is tracked based on the spherical polar coordinate system, which can effectively avoid a tracking failure caused by image distortion of the target object at different positions in the panoramic video, thereby increasing accuracy and a success rate of tracking the target object and improving a processing effect and a play effect of the panoramic video.

Figure 11:
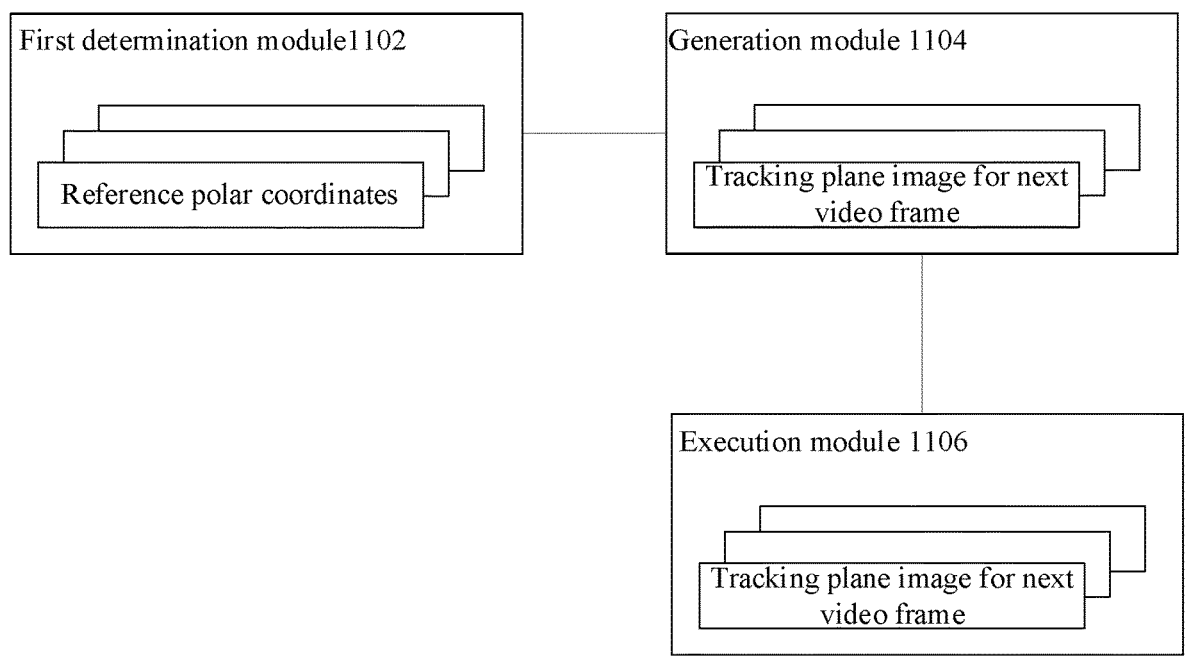
FIG. 11 is a schematic diagram illustrating a structure of a panoramic video data processing apparatus according to some embodiments of this application.

The present disclosure further provides some embodiments of the panoramic video data processing apparatus, and FIG. 11 shows a structural schematic diagram of a panoramic video data processing apparatus according to some embodiments of the present disclosure. As shown in FIG. 11, the apparatus includes:

a first determining module 1102, configured to determine reference polar coordinates of a center of a target border of a target object selected by a user in the current video frame when it is detected that the center of the target object enters a fixed view area;

a generating module 1104, configured to generate a tracking plane image of the next video frame by taking the reference polar coordinates as the center according to a panoramic image of the next video frame in a spherical polar coordinate system; and an execution module 1106, configured to take the next video frame as the current video frame, and return to execute the operation step of the generating a tracking plane image of a next video frame by taking the reference polar coordinates as a center according to a panoramic image of the next video frame in a spherical polar coordinate system, until the center of the target object leaves a released view area.

According to some embodiments, the apparatus further includes a setting module configured to:

set the fixed view area and the released view area in advance, where the fixed view area being included in the released view area.

According to some embodiments, the apparatus further includes a second determining module configured to:

determine an updated target border in a plane image corresponding to the target object in the current video frame leaving the released view area according to a vertex position of the target border in a plane image corresponding to a fixed viewing angle of the current video frame when it is detected that the center of the target object leaves the released view area;

perform image recognition on the plane image corresponding to the target object in the current video frame leaving the released view area to determine an object feature in the updated target border; and determine updated central polar coordinates of the target border in a tracking plane image of a next video frame according to the object feature in the updated target border.

According to some embodiments, the second determining module is further configured to:

determine vertex coordinates of the target border in the plane image corresponding to the fixed viewing angle of the current video frame;

determine updated vertex coordinates in the plane image corresponding to the target object in the current video frame leaving the released view area according to the vertex coordinates of the target border;

determine a maximum value and a minimum value of abscissa and a maximum value and a minimum value of ordinate in the updated vertex coordinates; and determine the updated target border in the plane image corresponding to the target object in the current video frame leaving the released view area according to the maximum value and the minimum value of the abscissa and the maximum value and the minimum value of the ordinate.

According to some embodiments, the apparatus further includes a third determining module configured to:

determine initial polar coordinates of the center of the target border when the target object enters the fixed view area, and determining central polar coordinates of the central position of a playing plane image of the current video frame when it is detected that the center of the target object leaves the released view area;

perform interpolation according to the initial polar coordinates and the central polar coordinates to obtain a preset number of intermediate polar coordinates;

determine the object feature corresponding to the target border in the central position according to the intermediate polar coordinates and the initial polar coordinates; and determine the updated central polar coordinates of the target border in the tracking plane image of the next video frame according to the object feature.

According to some embodiments, the third determining module is further configured to:

arrange the intermediate polar coordinates and the initial polar coordinates in sequence to obtain a polar coordinate set;

perform image recognition on the playing plane image of the current video frame to determine the object feature of the target object;

generate the tracking plane image of the current video frame by taking the i-th polar coordinates in the polar coordinate set as the center according to the panoramic image of the current video frame in the spherical polar coordinate system, where i is equal to 1; and enable i to increase by 1, taking the tracking plane image as the playing plane image, returning to the operation step of performing image recognition on the playing plane image of the current video frame to determine the object feature of the target object, until i is equal to the number of polar coordinates included in the polar coordinate set, thereby obtaining the object feature corresponding to the target border being located at the central position.

According to some embodiments, the apparatus further includes a playing module configured to:

determine the updated polar coordinates of the central position of the target border in the spherical polar coordinate system in the tracking plane image of the next video frame according to the object feature in the target border; and play the plane image of the next video frame by using the updated polar coordinates.

According to some embodiments, the second determining module is further configured to:

determine the target border corresponding to the marquee-selecting operation;

determine the corresponding recognition area according to the target border; and perform image recognition in the recognition area in the plane image corresponding to the current video frame leaving the released view area to determine the object feature of the target object.

According to some embodiments, the generating module 1104 is further configured to:

map the next video frame to the spherical polar coordinate system to obtain the panoramic image of the next video frame in the spherical polar coordinate system;

capture the panoramic image by taking the reference polar coordinates as the center and a preset angle as the range; and convert the captured panoramic image into the tracking plane image of the next video frame.

According to some embodiments, the playing module is further configured to:

Perform image recognition on the recognition area in the tracking plane image of the next video frame to determine the central position of the target object in the next video frame; and determine the updated polar coordinates of the central position of the target object in the next video frame in the spherical polar coordinate system.

According to some embodiments, the playing module is further configured to perform image recognition on the recognition area in the tracking plane image of the next video frame to obtain an image feature;

analyze and process the image feature and the object feature to obtain the confidence of the existence of the target object in the recognition area, and the position offset of the image feature relative to the central position of the recognition area; and determine the central position of the target object in the next video frame according to the central position of the target object in the playing plane image and the position offset when the confidence is greater than the confidence threshold.

Using the panoramic video data processing apparatus provided by the present disclosure the fixed view area and the released view area may be preset as buffer areas. After the center of the target object enters the fixed view area, the fixed reference polar coordinates are taken as the center to generate the tracking plane image corresponding to the subsequent video frame, that is, as long as the target object does not leave the released view area, the corresponding tracking plane image is always generated with the same polar coordinates as the center, thus effectively eliminating the large deflection of the tracking plane image when the target object moves at a large angle, and thus ensuring the tracking effect of the target object. In addition, when the center of the target object leaves the released view area, the target tracking may be performed in the subsequent video frame through the vertex position of the target border, or the target tracking may be performed in the subsequent video frame by interpolation, so as to ensure the tracking effect of the target object in the subsequent panoramic video. The foregoing describes a schematic solution of a panoramic video data processing apparatus in the embodiments. It is worthwhile to note that the technical solution of the panoramic video data processing apparatus and the technical solution of the foregoing panoramic video data processing method belong to the same concept. For details not described in the technical solution of the panoramic video data processing apparatus, references can be made to the descriptions of the technical solution of the foregoing panoramic video data processing method.

Figure 12:
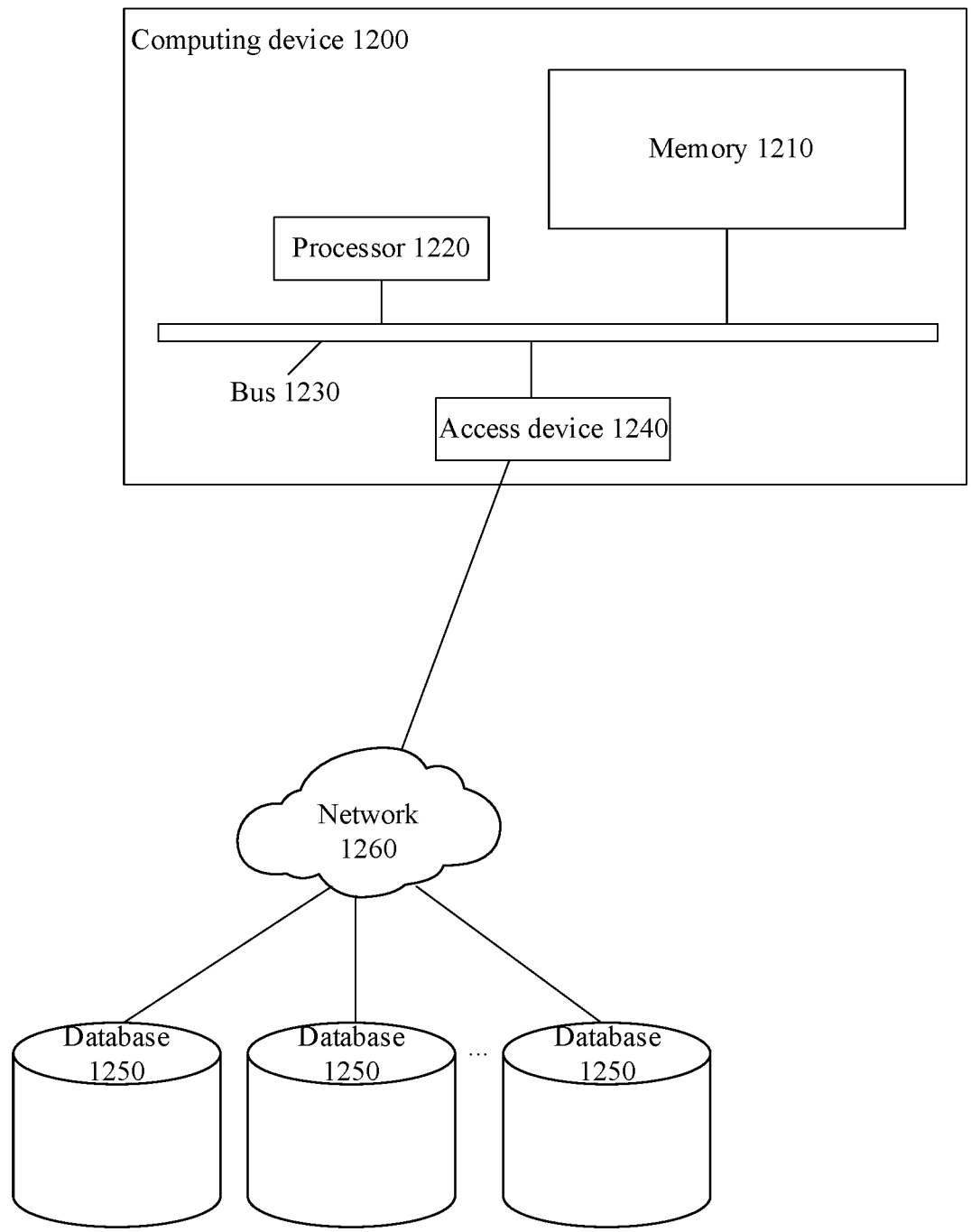
FIG. 12 is a block diagram illustrating a structure of a computing device according to some embodiments of this application.

FIG. 12 is a block diagram illustrating a structure of a computing device 1200 according to some embodiments of this application. Components of the computing device 1200 include but are not limited to a memory 1210 and a processor 1220. The processor 1220 and the memory 1210 are connected by using a bus 1230, and a database 1250 is configured to store data.

The computing device 1200 further includes an access device 1240 that enables the computing device 1200 to communicate via one or more networks 1260. Examples of these networks include a public switched telephone network (PSTN), a local area network (LAN), a wide area network (WAN), a private area network (PAN), or a combination of communications networks such as the Internet. The access device 1240 may include one or more of any type of wired or wireless network interface (for example, a network interface card (NIC)), for example, an IEEE 802.11 wireless local area network (WLAN) wireless interface, a Worldwide Interoperability for Microwave Access (WiMAX) interface, an Ethernet interface, a Universal Serial Bus (USB) interface, a cellular network interface, a Bluetooth interface, or a near field communication (NFC) interface.

In some embodiments of this application, the foregoing components of the computing device 1200 and other components not shown in FIG. 12 may also be connected to each other, for example, by using the bus. It should be understood that the block diagram illustrating the structure of the computing device shown in FIG. 12 is merely used as an example instead of a limitation on the scope of this application. A person skilled in the art may add or substitute other components as required.

The computing device 1200 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a still computing device such as a desktop computer or a PC. The computing device 1200 may be alternatively a mobile or still server.

The processor 1220 is configured to execute the following computer executable instructions to implement the following method:

in response to determining a box-selection operation for a target object in a current video frame is received, determining reference polar coordinates of a central position of a play plane image of the current video frame in a spherical polar coordinate system;

determining an object feature corresponding to the target object at the central position;

generating a tracking plane image of a next video frame by using the reference polar coordinates as a center based on a panoramic image of the next video frame in the spherical polar coordinate system;

determining updated polar coordinates of the central position of the target object in the tracking plane image of the next video frame in the spherical polar coordinate system based on the object feature of the target object; and using the updated polar coordinates as the reference polar coordinates to re-perform the operation step of generating a tracking plane image of a next video frame by using the reference polar coordinates as a center based on a panoramic image of the next video frame in the spherical polar coordinate system, until a tracking stop condition is reached and a reference polar coordinate sequence corresponding to the current video frame to a target video frame is obtained, where the target video frame is a corresponding video frame when the tracking stop condition is reached.

The foregoing describes a schematic solution of a computing device in the embodiments. It is worthwhile to note that the technical solution of the computing device and the technical solution of the foregoing panoramic video data processing method belong to the same concept. For details not described in detail in the technical solution of the computing device, references can be made to the descriptions of the technical solution of the foregoing panoramic video data processing method.

According to some embodiments of this application, a computer-readable storage medium is further provided. The computer-readable storage medium stores computer executable instructions, and the computer executable instructions are executed by a processor to implement operation steps of the foregoing panoramic video data processing method.

The foregoing describes a schematic solution of a computer-readable storage medium in the embodiments. It is worthwhile to note that the technical solution of the storage medium and the technical solution of the foregoing panoramic video data processing method belong to the same concept. For details not described in detail in the technical solution of the storage medium, references can be made to the descriptions of the technical solution of the foregoing panoramic video data processing method.

Specific embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular execution order to achieve the desired results. In some implementations, multi-tasking and parallel processing can or may be advantageous.

The computer instructions include computer program code, which may be in a source code form, an object code form, an executable file, an intermediate form, or the like. The computer-readable medium includes any entity or apparatus capable of carrying the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, etc. It is worthwhile to note that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It is worthwhile to note that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in the specification are all preferred embodiments, and involved actions and modules are not necessarily mandatory to this application.

In the foregoing embodiments, descriptions of the embodiments have respective focuses. For a part that is not described in detail in an embodiment, references can be made to related descriptions in another embodiment.

The preferred embodiments of this application disclosed above are merely intended to help describe this application. The optional embodiments do not describe all details, and the present invention is not limited to the specific implementations. Clearly, many modifications and changes may be made based on the content of this application. The embodiments are selected and specifically described in this application to better explain the principle and actual application of this application, so that a person skilled in the art can better understand and use this application. This application is only subjected to the claims and the scope and equivalents thereof.

What is claimed is:

1. A method, comprising:
in response to receiving a box-selection operation for a target object in a current video frame, determining reference polar coordinates of a central position of a play plane image of the current video frame in a spherical polar coordinate system;
determining an object feature corresponding to the target object;
generating a tracking plane image of a next video frame by using the reference polar coordinates as a center based on a panoramic image of the next video frame in the spherical polar coordinate system;
determining updated polar coordinates of the central position of the target object in the tracking plane image of the next video frame in the spherical polar coordinate system based on the object feature of the target object; and
using the updated polar coordinates as the reference polar coordinates to re-perform the generating a tracking plane image of a next video frame by using the reference polar coordinates as a center based on a panoramic image of the next video frame in the spherical polar coordinate system, until determining a tracking stop condition is reached and a reference polar coordinate sequence corresponding to the current video frame to a target video frame is obtained, wherein the target video frame is a corresponding video frame in response to determining the tracking stop condition is reached.

2. The method according to claim 1, further comprises:
in response to receiving a box-selection operation for a target object in a current video frame, determining initial polar coordinates of a central position of the target object in a spherical polar coordinate system; and
wherein the determining an object feature corresponding to the target object comprises:
determining, based on the initial polar coordinates and reference polar coordinates of a central position of a play plane image of the current video frame, an object feature corresponding to the target object at the central position.

3. The method according to claim 2, wherein the determining an object feature corresponding to the target object at the central position comprises:
determining center polar coordinates of the central position of the play plane image of the current video frame in the spherical polar coordinate system;

performing interpolation based on the initial polar coordinates and the center polar coordinates to obtain a preset quantity of intermediate polar coordinates; and determining the object feature corresponding to the target object at the central position based on the intermediate polar coordinates and the initial polar coordinates.

4. The method according to claim 3, wherein the determining the object feature corresponding to the target object at the central position comprises:

sequentially arranging the intermediate polar coordinates and the initial polar coordinates to obtain a polar coordinate set;

performing image recognition on the play plane image of the current video frame to determine an object feature of the target object;

generating a tracking plane image of the current video frame by using the ith polar coordinates in the polar coordinate set as a center based on a panoramic image of the current video frame in the spherical polar coordinate system, wherein i is equal to 1; and incrementing i by 1 and using the tracking plane image as the play plane image to re-perform the performing image recognition on the play plane image of the current video frame to obtain an object feature of the target object until i is equal to a quantity of polar coordinates comprised in the polar coordinate set, to obtain the object feature corresponding to the target object at the central position.

5. The method according to claim 4, wherein the performing image recognition on the play plane image of the current video frame to determine an object feature of the target object comprises:

determining a target box corresponding to the box-selection operation;

determining a corresponding recognition region based on the target box; and performing image recognition on the corresponding recognition region in the play plane image of the current video frame to determine the object feature of the target object.

6. The method according to claim 2, wherein the generating a tracking plane image of a next video frame by using the reference polar coordinates as a center comprises:

mapping the next video frame to the spherical polar coordinate system to obtain the panoramic image of the next video frame in the spherical polar coordinate system;

capturing the panoramic image within a range of a preset angle by using the reference polar coordinates as a center; and converting the captured panoramic image into the tracking plane image of the next video frame.

7. The method according to claim 5, wherein the determining updated polar coordinates of the central position of the target object in the tracking plane image of the next video frame in the spherical polar coordinate system comprises:

performing image recognition on the recognition corresponding region in the tracking plane image of the next video frame to determine the central position of the target object in the next video frame; and determining the updated polar coordinates of the central position of the target object in the next video frame in the spherical polar coordinate system.

8. The method according to claim 7, wherein the performing image recognition on the corresponding recognition region in the tracking plane image of the next video frame to determine the central position of the target object in the next video frame comprises:

performing image recognition on the corresponding recognition region in the tracking plane image of the next video frame to obtain an image feature;

analyzing the image feature and the object feature to obtain a confidence of the existence of the target object in the corresponding recognition region and a position offset of the image feature relative to a central position of the corresponding recognition region; and in response to determining the confidence is greater than a confidence threshold, determining the central position of the target object in the next video frame based on a central position of the target object in the play plane image and the position offset.

9. The method according to claim 8, wherein after the determining the central position of the target object in the next video frame, the method further comprises:

merging the image feature and the object feature to obtain an updated object feature.

10. The method according to claim 8, wherein after the generating a tracking plane image of a next video frame by using the reference polar coordinates as a center, the method further comprises:

performing shot boundary detection on the tracking plane image of the next video frame; and determining a confidence indicating how likely the next video frame belongs to a current shot.

11. The method according to claim 10, wherein determining the tracking stop condition is reached comprises:

in response to determining the confidence of the existence of the target object in the corresponding recognition region is less than a first confidence threshold or the confidence indicating how likely the next video frame belongs to the current shot is less than a second confidence threshold, determining that the tracking stop condition is reached.

12. The method according to claim 2, wherein after the determining updated polar coordinates of the central position of the target object in the tracking plane image of the next video frame in the spherical polar coordinate system, the method further comprises:

filtering the updated polar coordinates to obtain filtered updated polar coordinates; and using the filtered updated polar coordinates as center polar coordinates of the tracking plane image of the next video frame.

13. A computing device, comprising:

one or more processors; a memory storing one or more programs configured to be executed by the one or more processors, the one or more programs including instructions for:

in response to receiving a box-selection operation for a target object in a current video frame, determining reference polar coordinates of a central position of a play plane image of the current video frame in a spherical polar coordinate system;

determining an object feature corresponding to the target object;

generating a tracking plane image of a next video frame by using the reference polar coordinates as a center based on a panoramic image of the next video frame in the spherical polar coordinate system;

determining updated polar coordinates of the central position of the target object in the tracking plane image of the next video frame in the spherical polar coordinate system based on the object feature of the target object; and using the updated polar coordinates as the reference polar coordinates to re-perform the generating a tracking plane image of a next video frame by using the reference polar coordinates as a center based on a panoramic image of the next video frame in the spherical polar coordinate system, until determining a tracking stop condition is reached and a reference polar coordinate sequence corresponding to the current video frame to a target video frame is obtained, wherein the target video frame is a corresponding video frame in response to determining the tracking stop condition is reached.

14. The computing device of claim 13, wherein the one or more programs further comprises instructions for:

in response to receiving a box-selection operation for a target object in a current video frame, determining initial polar coordinates of a central position of the target object in a spherical polar coordinate system; and wherein the determining an object feature corresponding to the target object at the central position comprises:

determining, based on the initial polar coordinates and reference polar coordinates of a central position of a play plane image of the current video frame, an object feature corresponding to the target object at the central position.

15. The computing device of claim 14, wherein the determining an object feature corresponding to the target object at the central position comprises:

determining center polar coordinates of the central position of the play plane image of the current video frame in the spherical polar coordinate system;

performing interpolation based on the initial polar coordinates and the center polar coordinates to obtain a preset quantity of intermediate polar coordinates; and determining the object feature corresponding to the target object at the central position based on the intermediate polar coordinates and the initial polar coordinates.

16. The computing device of claim 15, wherein the determining the object feature corresponding to the target object at the central position comprises:

sequentially arranging the intermediate polar coordinates and the center polar coordinates to obtain a polar coordinate set;

performing image recognition on the play plane image of the current video frame to determine an object feature of the target object;

generating a tracking plane image of the current video frame by using the ith polar coordinates in the polar coordinate set as a center based on a panoramic image of the current video frame in the spherical polar coordinate system, wherein i is equal to 1; and incrementing i by 1 and using the tracking plane image as the play plane image to re-perform the performing image recognition on the play plane image of the current video frame to obtain an object feature of the target object until i is equal to a quantity of polar coordinates comprised in the polar coordinate set, to obtain the object feature corresponding to the target object at the central position.

17. The computing device of claim 16, wherein the performing image recognition on the play plane image of the current video frame to determine an object feature of the target object comprises:

determining a target box corresponding to the box-selection operation;

determining a corresponding recognition region based on the target box; and performing image recognition on the corresponding recognition region in the play plane image of the current video frame to determine the object feature of the target object.

18. The computing device of claim 14, wherein the generating a tracking plane image of a next video frame by using the reference polar coordinates as a center comprises:

mapping the next video frame to the spherical polar coordinate system to obtain the panoramic image of the next video frame in the spherical polar coordinate system;

capturing the panoramic image within a range of a preset angle by using the reference polar coordinates as a center; and converting the captured panoramic image into the tracking plane image of the next video frame.

19. The computing device of claim 17, wherein the determining updated polar coordinates of the central position of the target object in the tracking plane image of the next video frame in the spherical polar coordinate system comprises:

performing image recognition on the corresponding recognition region in the tracking plane image of the next video frame to determine the central position of the target object in the next video frame; and determining the updated polar coordinates of the central position of the target object in the next video frame in the spherical polar coordinate system.

20. A non-transitory computer-readable storage medium storing one or more programs, the one or more programs comprising instructions, wherein the instructions, upon the execution by one or more processors of an electronic device, cause the electronic device to perform:

in response to receiving a box-selection operation for a target object in a current video frame, determining reference polar coordinates of a central position of a play plane image of the current video frame in a spherical polar coordinate system;

determining an object feature corresponding to the target object at the central position;

generating a tracking plane image of a next video frame by using the reference polar coordinates as a center based on a panoramic image of the next video frame in the spherical polar coordinate system;

determining updated polar coordinates of the central position of the target object in the tracking plane image of the next video frame in the spherical polar coordinate system based on the object feature of the target object; and using the updated polar coordinates as the reference polar coordinates to re-perform the f generating a tracking plane image of a next video frame by using the reference polar coordinates as a center based on a panoramic image of the next video frame in the spherical polar coordinate system, until determining a tracking stop condition is reached and a reference polar coordinate sequence corresponding to the current video frame to a target video frame is obtained, wherein the target video frame is a corresponding video frame in response to determining the tracking stop condition is reached.

* * * * *